United States Patent [19]

Usui et al.

[11] Patent Number: 5,594,447
[45] Date of Patent: Jan. 14, 1997

[54] MOVING TARGET IDENTIFYING SYSTEM IN A BASE STATION RADAR UNIT FOR SPECIFYING INFORMATION ABOUT MOVING TARGETS CARRYING A MOBILE STATION RADAR UNIT

[75] Inventors: Ryuzaburo Usui; Masafumi Iwamoto; Kazuhiko Yamamoto; Takahiko Fujisaka; Michimasa Kondo, all of Kanagawa, Japan

[73] Assignee: Mitsubishi Denki Kabushiki Kaisha, Tokyo, Japan

[21] Appl. No.: 457,614

[22] Filed: Jun. 1, 1995

[30] Foreign Application Priority Data

Jan. 11, 1995 [JP] Japan ......................................... 7-2682

[51] Int. Cl.⁶ ..................................................... G01S 13/76
[52] U.S. Cl. ................... 342/42; 342/44; 342/50; 342/51; 340/928; 340/825.34; 340/825.54
[58] Field of Search .................................. 342/42, 44, 50, 342/51; 340/825.34, 825.54, 928, 990, 995

[56] References Cited

U.S. PATENT DOCUMENTS 4,682,173  7/1987  Kotoh ........................ 342/51

FOREIGN PATENT DOCUMENTS 53-44094   4/1978   Japan.
62-15926   7/1987   Japan.
4-315081  11/1992   Japan.

Primary Examiner—John B. Sotomayor
Attorney, Agent, or Firm—Wolfe, Greenfield & Sacks, P.C.

[57] ABSTRACT

A vehicle ID radar system has a simple construction and obtains high identifying performance by making a general identification based on a plurality of responses. There are provided an antenna for obtaining a plurality of question signals from a base station radar unit, a receiver for processing the signals received from the antenna, a question code demodulator for demodulating question codes from the received signals, a question code decoder for decoding the question codes and reading responses respectively corresponding to the plurality of questions from a plurality of data bases, a response code generator for generating response signals, and a transmitter for modulating the response signals and supplying them to the antenna.

23 Claims, 29 Drawing Sheets

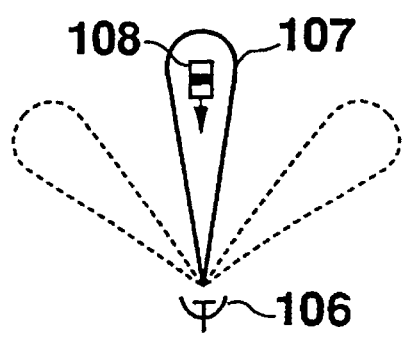
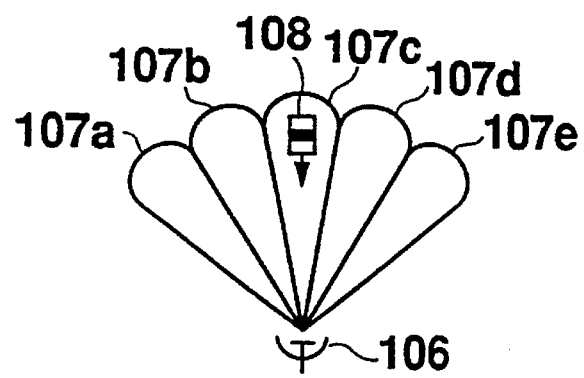
Fig. 21 (a)  Fig. 21 (b)
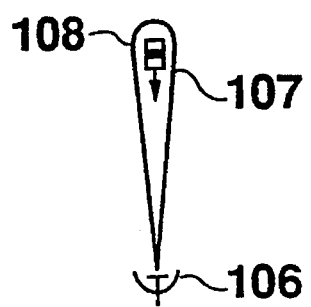
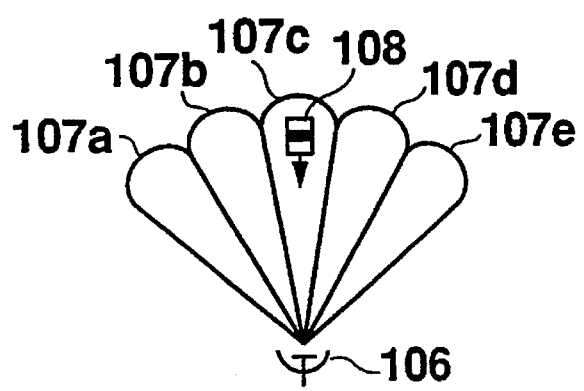
Fig. 22 (a)  Fig. 22 (b)

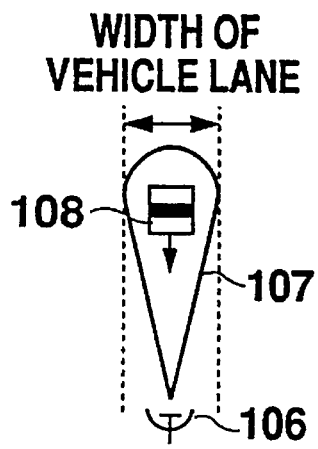
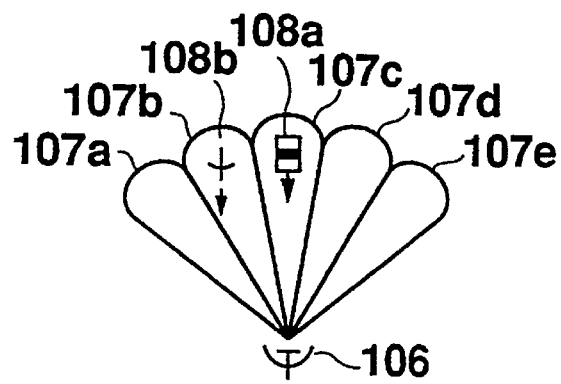
Fig. 23 (a)  Fig. 23 (b)
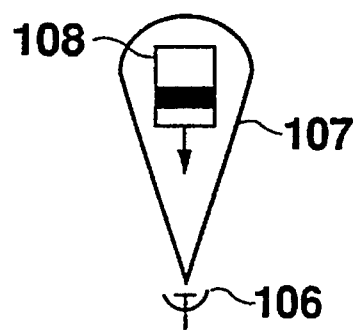
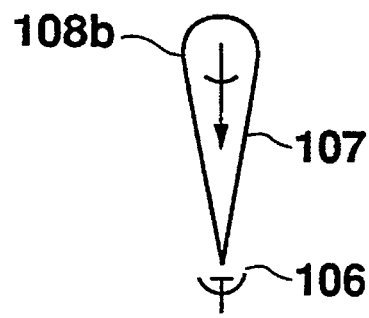
Fig. 24 (a)  Fig. 24 (b)

5,594,447

MOVING TARGET IDENTIFYING SYSTEM IN A BASE STATION RADAR UNIT FOR SPECIFYING INFORMATION ABOUT MOVING TARGETS CARRYING A MOBILE STATION RADAR UNIT

BACKGROUND OF THE INVENTION (1) Field of the Invention

This invention relates to a moving target identifying system wherein individual information about moving targets is specified in a base station radar unit, comprising a base station radar unit and mobile station radar units installed in the moving targets. More specifically, it relates to a base station radar unit and mobile station radar unit used in such a system.

(2) Description of the Related Art

One type of system used to identify moving targets is a vehicle ID radar system. FIG. 29 is a drawing showing the concept of such a vehicle ID radar system comprising a base station radar unit 1 installed on a road or at a toll point, and a vehicle radar unit 3 mounted on the number plate of a vehicle.

FIG. 30 is a schematic diagram of the conventional base station radar unit 1 used in the vehicle ID radar system of FIG. 29. The base station radar unit 1 of FIG. 30 uses secondary radar.

FIG. 30 shows an oscillator 11 that generates a transmitting reference signal, a modulator 12 that modulates the transmitting reference signal based on the output of a question code generator 13, a transmitter 14 that generates a transmitted signal based on the output of the modulator 12, and a transmitting antenna 16a that radiates this transmitting signal to the vehicle-mounted radar unit 3.

The figure also shows a receiving antenna 16b that receives a signal from the vehicle-mounted radar unit 3, a receiver 17 that processes signals received from the vehicle-mounted radar unit 3, a response code demodulator 18 that demodulates a response code from the vehicle-mounted radar unit 3 output by the receiver 17, a response code decoder 19 that decodes the response code based on a vehicle data base 20, a display unit 21 that displays the decoded result of the response code decoder 19, and a communications interface 22 for transferring the decoded result of the response code decoder 19 outside the station. Data showing the relationships between vehicles and response codes used in identifying vehicles is stored in the vehicle data base 20.

FIG. 31 is a schematic diagram of the conventional vehicle-mounted radar unit 3 in the vehicle ID radar system shown in FIG. 29.

In FIG. 31, an oscillator 31, modulator 32, transmitter 34, transmitting antenna 36a, receiving antenna 36b and receiver 37 respectively correspond to the oscillator 11, modulator 12, transmitter 14, transmitting antenna 16a, receiving antenna 16b and receiver 17 of the base station radar unit 1, and have identical functions to them.

In addition, the vehicle-mounted radar unit 3 comprises a question code demodulator 28 that demodulates question codes contained in the signal transmitted by the base station radar unit 1, and a response code generator 41 that generates response codes based on the demodulated question codes.

FIG. 32 is a diagram showing the question and answer exchange that takes place between the base station radar unit 3 and vehicle-mounted radar unit 3.

In a conventional vehicle ID data system, the base station radar unit 1 may for example be installed near a toll point on a toll road, issuing predetermined questions to vehicles that pass through the point, identifying the vehicles and performing tariffing by decoding the responses to these questions. The vehicle-mounted radar unit 3 in this vehicle ID radar system, on the other hand, generates predetermined responses to the questions from the base station radar unit 1, and returns them to the base station. Due to the nature of this question and answer exchange, this vehicle ID radar system is a type of secondary radar.

The action of the base station radar unit 1 will now be described in detail with reference to FIG. 30.

The question code generator 13 generates question codes continuously, or when it is detected that a vehicle is near, it generates a code for that vehicle. This question code is modulated in the modulator 12, and transmitted to the vehicle-mounted radar unit 3 via the transmitter 14 and transmitting antenna 16a.

In response to the transmitted question code, the vehicle-mounted radar unit 3 returns a predetermined response code. The action of the vehicle-mounted radar unit 3 will be described hereinafter. The signal transmitted by the vehicle-mounted radar unit 3 is received by the receiving antenna 16b and input to the receiver 17. The response code demodulator 18 demodulates the response code based on the output of the receiver 17.

The response code decoder 19 decodes the demodulated response code and generates an address signal to read the vehicle data base 20.

Based on this address signal, the response code decoder 19 reads corresponding vehicle information. The processing result of the response code decoder 19 is displayed on the display unit 21, and output to the communications interface 22 to perform communication with other equipment.

Next, the vehicle-mounted radar unit 3 will be described in detail with reference to FIG. 31.

The signal related to question codes radiated by the base station radar unit 1, is received by the receiving antenna 36b and input to the receiver 37. A question code demodulator 38 demodulates the question code based on the output of the receiver 37.

The response code generator 41 generates a response as a response code corresponding to the nature of the question specified by the question code output by the question code demodulator 38.

This response code is input to the modulator 32 and modulated. Subsequently, it is transmitted to the base station radar unit 1 via the transmitter 34 and transmitting antenna 36a.

A typical question and response sequence is shown in FIG. 32. This figure shows the case of a question "What is your ID?", to which for example the response "Yokohama 77-1234" is obtained.

This conventional vehicle ID radar system can therefore identify vehicles.

However, in the aforesaid conventional vehicle ID radar system, only one response code is returned from the vehicle-mounted radar unit 3. The base station radar unit 1 therefore could not obtain other information from the vehicle, for example information about its speed or position, whether the vehicle battery is functioning, or whether or not the vehicle-mounted radar unit is functioning properly.

It may also occur that the response code generator 41 of the vehicle-mounted radar unit 3 has been modified so that a correct response code cannot be obtained. In this case, toll road and other systems using this vehicle ID radar system may not function correctly.

SUMMARY OF THE INVENTION

This invention was conceived to overcome the above problems, and aims to provide a compact, economical base station radar unit, mobile station radar unit and moving target identifying system having excellent performance by means of a simple construction.

In order to achieve the above objectives, the moving target identifying system according to this invention comprises a base station radar unit comprising a question generator which generates a plurality of predetermined questions, a base station transmitter which modulates the plurality of question signals output by the generator, and outputs them a base station antenna which radiates the output of the transmitter outside the station, and receives signals from outside the station a base station receiver which processes signals received by the base station antenna a moving target information data base wherein anticipated responses to the plurality of questions are stored a response demodulator which demodulates a plurality of response signals contained in the output of the base station receiver so as to obtain a plurality of responses, and reads a corresponding plurality of anticipated responses from the data base based on these demodulated results, and identifying means which identifies the moving targets by comparing the plurality of responses with the plurality of anticipated responses, and further comprises a mobile station radar unit comprising a mobile station antenna which receives transmitted signals from the base station radar unit, and radiates transmitted signals outside the station, a mobile station receiver which processes signals received by the mobile station antenna, a response data base containing pre-stored response data corresponding to the plurality of questions from the base station radar unit, a question demodulator which demodulates a plurality of question signals contained in the output of the mobile station receiver, and reads a corresponding plurality of responses from the response data base based on these demodulated results, a response generator which generates a plurality of response signals based on the output of the question demodulator, and a mobile station transmitter which modulates the plurality of response signals output by the response generator, and outputs the results to the mobile station antenna.

A base station radar unit according to another invention comprises a question generator which generates a plurality of predetermined questions, a base station transmitter which modulates and outputs the plurality of question signals output by the question generator, a base station antenna which radiates the output of the transmitter outside the station, and receives signals from outside the station, a base station receiver which processes signals received by the base station antenna, a moving target information data base wherein anticipated responses to the plurality of questions are stored, a response demodulator which demodulates a plurality of response signals contained in the output of the base station receiver so as to obtain a plurality of responses, and reads a corresponding plurality of anticipated responses from the data base based on these demodulated results, and identifying means which identifies the moving targets by comparing the plurality of responses with the plurality of anticipated responses.

A mobile station radar unit according to another invention comprises a mobile station antenna which receives transmitted signals from outside the station, and radiates transmitted signals outside the station, a mobile station receiver which processes signals received by the mobile station antenna, a response data base containing pre-stored response data corresponding to the plurality of questions from outside the station, a question demodulator which demodulates a plurality of question signals contained in the output of the mobile station receiver, and reads a corresponding plurality of responses from the response data base based on these demodulated results, a response generator which generates a plurality of response signals based on the output of the question demodulator, and a mobile station transmitter which modulates the plurality of response signals output by the response generator, and outputs the results to the mobile station antenna.

A mobile station radar unit according to another invention is provided with a data base updating unit which determines, based on the output of the question demodulator, whether or not a question is a predetermined data updating command, and updates the response data base when the question is a data updating command.

A base station radar unit according to another invention is provided with an alarm generator which outputs an alarm signal to the base station transmitter when the identification result for a moving target obtained by the identifying means is different from a predetermined identification result.

A mobile station radar unit according to another invention is provided with an alarm demodulator which determines whether or not a question contained in the output of the mobile station receiver is an alarm, and demodulates it when it is an alarm, and an alarm device which outputs an alarm based on the output of the alarm demodulator.

A base station radar unit according to another invention is provided with a tariffing data base which stores data related to user tariffing, a measuring instrument interface which receives data from outside measuring instruments, and tariff processing means which performs tariff processing based on measuring instrument data output by the measuring instrument interface, and updates corresponding user data in the tariffing data base based on this tariff processing result and the identification result of the identifying means.

A base station radar unit according to another invention comprises a question generator which generates a predetermined question, a pulse generator which generates pulses at predetermined intervals, a switch which selects and outputs either the output of the question generator or the output of the pulse generator, a base station transmitter which modulates and outputs the signal output by the switch, a base station antenna which radiates the output of the transmitter outside the station, and receives a signal from outside the station, a base station receiver which processes a signal received by the base station antenna, a moving target information data base wherein an anticipated response to the question is stored, a response demodulator which demodulates a response signal contained in the output of the base station receiver so as to obtain a response when the output of the question generator is selected, and reads an anticipated response from the data base-based on this demodulated result, moving target measuring means which collects data about a moving target based on a reflected signal from the moving target output by the base station receiver when the pulse generator is selected and identifying means which identifies the moving target by comparing the response and anticipated response output by the response demodulator with information about the moving target output by the moving target measuring means.

A base station radar unit according to another invention is provided with a moving target detector which detects the presence or absence of a moving target based on the output of the base station receiver when the pulse generator is selected, and with a moving target measuring means that performs processing when the moving target is detected by the moving target detector.

A base station radar unit according to another invention is provided with a beam pattern controller that controls the beam pattern of the base station antenna to a first beam pattern when a question generator is selected, and controls the beam pattern of the base station antenna to a second beam pattern when a pulse generator is selected.

A base station radar unit according to another invention comprises a question generator which generates a predetermined question, a pulse generator which generates pulses at predetermined intervals, a switch which selects and outputs either the output of the question generator or the output of the pulse generator, a base station transmitter which modulates and outputs the signal output by the switch, a base station antenna which radiates the output of the transmitter outside the station, and receives a signal from outside the station, a base station receiver which processes the signal received by the base station antenna, a moving target information data base wherein an anticipated response to the question is stored, a response demodulator which demodulates a response signal contained in the signals received from a moving target output by the base station receiver when the output of the question generator is selected, and reads an anticipated response from the moving target information data base based on this demodulated result, a moving target detector which detects the moving target based on a reflected signal from the moving target output by the base station receiver when the pulse generator is selected, a moving target tracking device which tracks the moving target when the moving target is detected by the moving target detector, and an antenna driver for orienting the base station antenna toward the moving target based on the output of the moving target tracking device.

A base station radar unit according to another invention comprises a question generator which generates a predetermined question, a base station transmitter which modulates and outputs question signals output by the generator, a base station antenna which radiates the output of the transmitter outside the station, and receives a signal from outside the station, a base station receiver which processes a signal received from a moving target by the base station antenna, a moving target information data base wherein an anticipated response to the question is stored, a response demodulator which demodulates a response signal contained in the output of the base station receiver so as to obtain a response, and reads a corresponding anticipated response from the data base based on this demodulated result, imaging means that obtains an image of a moving target, moving target recognizing means which obtains information about the moving target based on the output of the imaging means, and identifying means which identifies the moving target by comparing the response and anticipated response output by the response demodulator with information about the moving target output by the recognizing means.

A mobile station radar unit according to another invention comprises a mobile station antenna which receives a transmitted signal from outside the station, and radiates a transmitted signal outside the station, a mobile station receiver which processes the signal received by the mobile station antenna, a response data base containing pre-stored response data corresponding to questions from outside the station, a question demodulator which demodulates a question signal contained in the output of the mobile station receiver, and reads a corresponding response from the response data base based on this demodulated result, a response generator which generates a response signal based on the output of the question demodulator, a pulse generator which generates pulses at predetermined intervals, a switch which selects and outputs either the output of the question generator or the output of the pulse generator, a mobile station transmitter which modulates the signal output by the switch, and outputs the result to the mobile station antenna, and target measuring means which obtains information about an external target output by the mobile station receiver based on a reflected signal from the target when the output of the pulse generator is selected.

A mobile station radar unit according to another invention is provided wherein the beam pattern of the base station antenna is controlled to a first beam pattern when the output of a response generator is selected, and is controlled to a second beam pattern when the output of a pulse generator is selected.

A moving target identifying system according to another invention comprises a base station radar unit comprising a question generator which generates a predetermined question, a charge storing command generator which generates a predetermined charge storing command, a switch which selects either the output of the question generator or the output of the charge storing command generator, a base station transmitter which modulates and outputs the output of the switch, a base station antenna which radiates the output of the transmitter outside the station, and receives a signal from outside the station, a base station receiver which processes the signal received by the base station antenna, a moving target information data base wherein an anticipated response to the question is pre-stored, a response demodulator which demodulates a response signal contained in the output of the base station receiver so as to obtain a response, and reads a corresponding anticipated response from the data base based on this demodulated result, and identifying means which identifies a moving target by comparing the response with the anticipated response, and further comprising a mobile station radar unit comprising a mobile station antenna which receives a transmitted signal from the base station radar unit, and radiates a transmitted signal outside the station, a mobile station receiver which processes the signal received by the mobile station antenna, a response data base containing pre-stored response data corresponding to questions from the base station radar unit, a question demodulator which demodulates a question signal contained in the output of the mobile station receiver, and reads a corresponding response from the response data base based on this demodulated result, a response generator which generates a response signal based on the output of the question demodulator, a mobile station transmitter which modulates the response signal output by the response generator and outputs the result to the mobile station antenna, a distributor which distributes the signals received by the mobile station antenna when the question demodulated by the question demodulator is a charge storing command, a rectifier which rectifies the output signal from the distributor, and an accumulator which functions as a power supply charged by the output of the rectifier.

A base station radar unit according to another invention comprises a question generator which generates a predetermined question, a charge storing command generator which generates a predetermined charge storing command, a switch which selects either the output of the question generator or the output of the charge storing command generator, a base station transmitter which modulates and outputs the output of the switch, a base station antenna which radiates the output of the transmitter to outside the station, and receives a signal from outside the station, a base station receiver which processes the signal received by the base station antenna, a moving target information data base wherein an anticipated response to the question is prestored, a response demodulator which demodulates a response signal contained in the output of the base station receiver so as to obtain a response, and reads a corresponding anticipated response from the data base based on this demodulated result, and identifying means which identifies a moving target by comparing the response with the anticipated response.

A mobile station radar unit according to another invention comprises a mobile station antenna which receives a transmitted signal from the base station radar unit, and radiates a transmitted signal outside the station, a mobile station receiver which processes the signal received by the mobile station antenna, a response data base containing pre-stored response data corresponding to questions from the base station radar unit, a question demodulator which demodulates a question signal contained in the output of the mobile station receiver, and reads a corresponding response from the response data base based on this demodulated result, a response generator which generates a response signal based on the output of the question demodulator, a mobile station transmitter which modulates the response signal output by the response generator and outputs the result to the mobile station antenna, a distributor which distributes the signals received by the mobile station antenna when the question demodulated by the question demodulator is a charge storing command, a rectifier which rectifies the output signal from the distributor, and an accumulator which functions as a power supply charged by the output of the rectifier.

According to this invention, identification of moving targets is performed definitively so that the reliability of a system is improved.

According to another invention, a data base updating unit is provided so that identification of moving targets is performed more definitively.

According to yet another invention, an alarm generator is provided so that abnormalities of moving targets can be notified.

According to yet another invention, an alarm is provided so that abnormalities of moving targets can be notified.

According to yet another invention, a tariffing data base, an instrument interface and tariff processing means are provided so that tariff processing can be performed together with identification of moving targets.

According to yet another invention, identification can be performed using secondary radar information and primary radar information, so identification of moving targets is performed definitively.

According to another invention, a moving target detector is provided, and the aforesaid moving target measuring means performs processing when a moving target has been detected by the aforesaid detector, so moving target measurement is simple.

According to yet another invention, a beam pattern controller is provided so that a suitable beam can be formed according to the operating mode.

According to yet another invention, a moving target can be tracked and questioned over a long time period so that the system can be applied to moving targets that are far away.

According to yet another invention, identification can be performed definitively using information from a plurality of sensors.

According to yet another invention, a target measuring means is provided so that an anti-collision function can be provided together with an identifying function.

According to yet another invention, a mobile station radar system is provided with a beam pattern controller so that a beam pattern suited to a target can be formed.

According to yet another invention, a mobile station radar system can be operated without any load on a moving target's battery.

BRIEF DESCRIPTION OF THE DRAWINGS

FIG. 21(a) is a drawing showing a typical beam pattern for primary radar search using a phased array system according to the seventh embodiment of this invention.

FIG. 21(b) is a drawing showing a typical beam pattern for primary radar search using a DBF system according to the seventh embodiment of this invention.

FIG. 22(a) is a drawing showing a typical beam pattern for primary radar tracking using a phased array system according to the seventh embodiment of this invention.

FIG. 22(b) is a drawing showing a typical beam pattern for primary radar tracking using a DBF system according to the seventh embodiment of this invention.

FIG. 23(a) is a drawing showing a typical secondary radar beam pattern using a phased array system according to the seventh embodiment of this invention.

FIG. 23(b) is a drawing showing a typical secondary radar beam pattern using a DBF system according to the seventh embodiment of this invention.

FIG. 24(a) is a drawing showing a typical secondary radar beam pattern when the vehicle is a large vehicle according to the seventh embodiment of this invention.

FIG. 24(b) is a drawing showing a typical secondary radar beam pattern when the vehicle is a small vehicle according to the seventh embodiment of this invention.

DESCRIPTION OF THE PREFERRED EMBODIMENTS

Embodiment 1

Figure 1:
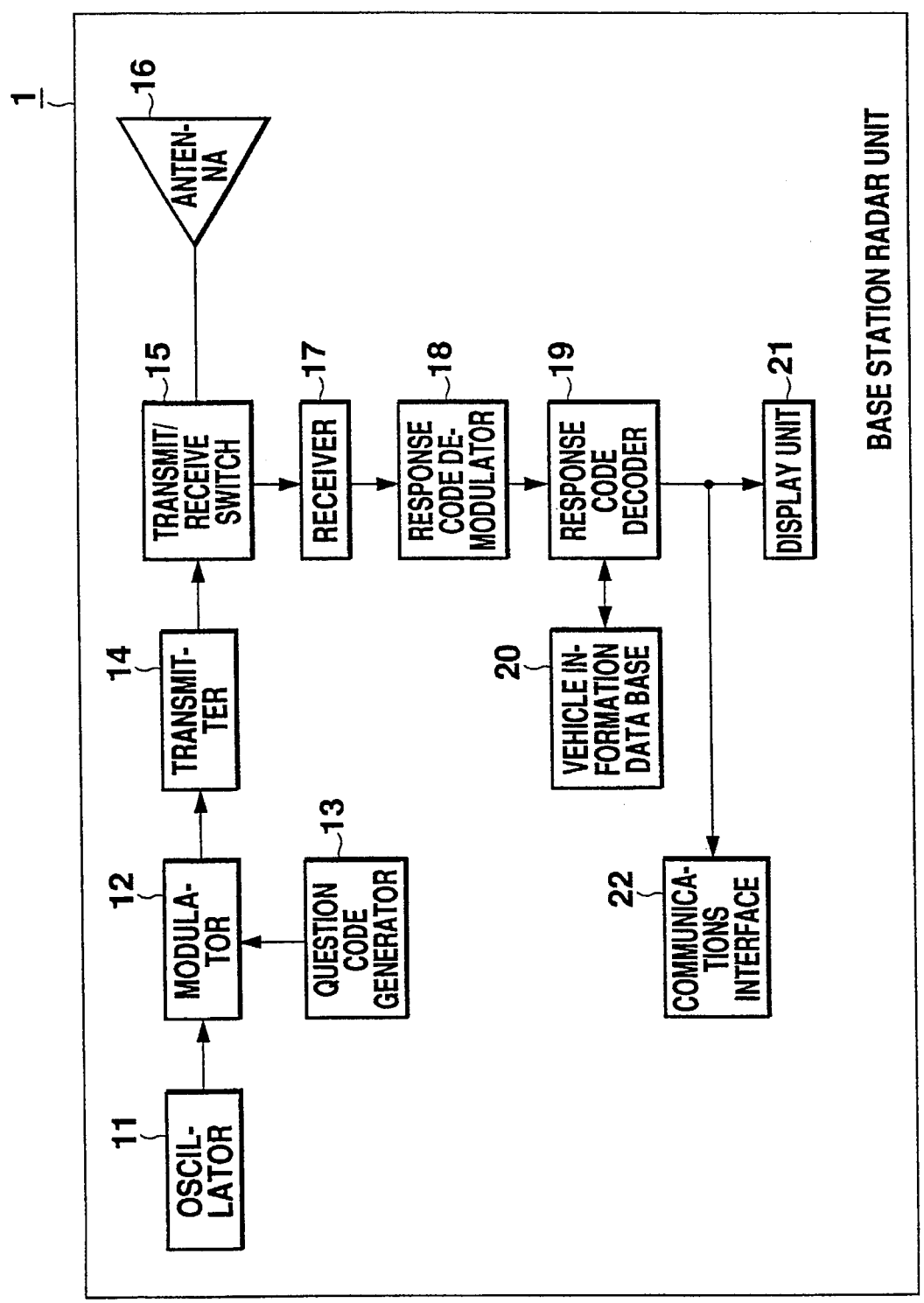
FIG. 1 is a schematic drawing of a base station radar unit according to a first embodiment of this invention.

FIG. 1 is a block diagram showing the construction of a base station radar unit 1 used in a vehicle ID radar system according to a first embodiment of this invention.

FIG. 1 shows an oscillator 11 for generating a transmitting reference signal, a modulator 12 for modulating the transmitting reference signal based on the output of a question code generator 13, a transmitter 14 for generating a transmitted signal based on the output of the modulator 12, a transmit/receive switch 15 that supplies the output of the transmitter 14 to an antenna when transmitting, and supplies a received signal to a receiver 17 when receiving, and an antenna 16 that radiates the transmitted signal to a vehicle-mounted radar unit 3 and receives a signal from the vehicle-mounted radar unit 3.

Also shown in FIG. 1 are the receiver 17 that processes the signal received from the vehicle-mounted radar unit 3, a response code demodulator 18 that demodulates a response code from the vehicle-mounted radar unit 3, a response code decoder 19 that decodes the response code based on a vehicle information data base 20, a display unit 21 that displays the decoded result from the response code decoder 19, and a communications interface 22 that transmits the decoded result from the response code decoder 19 to outside the station. The vehicle information data base 20 stores data concerning the relationships between vehicles and response codes which is used to identify the vehicles.

Figure 2:
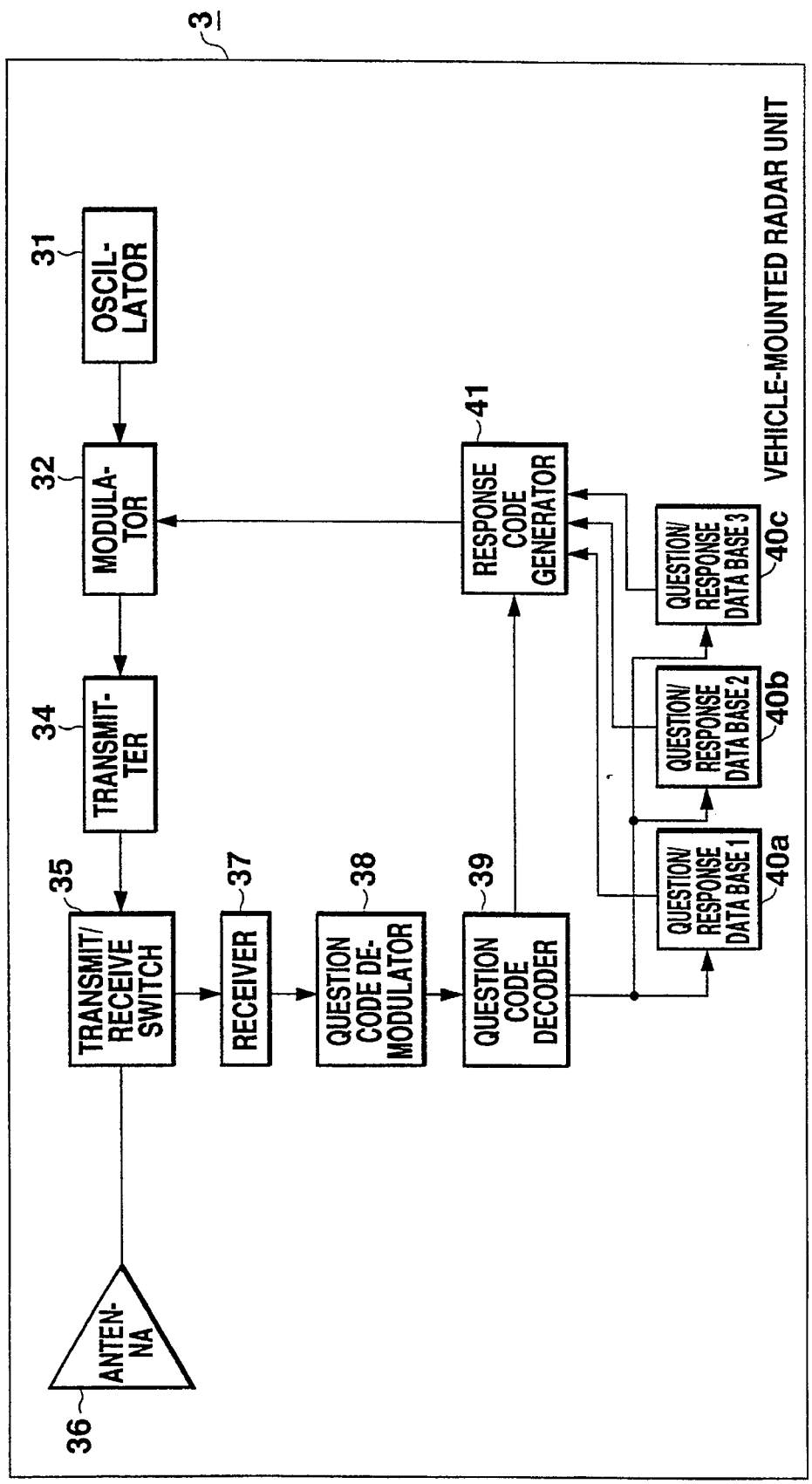
FIG. 2 is a schematic drawing of a vehicle-mounted radar unit according to the first embodiment of this invention.

FIG. 2 is a block diagram showing the construction of the vehicle-mounted radar unit 3 used in the vehicle ID radar system according to the first embodiment of this invention.

FIG. 2 shows an oscillator 31, modulator 32, transmitter 34, receive/send switch 35, antenna 36, receiver 37 that respectively correspond with the oscillator 11, modulator 12, transmitter 14, send/receive switch 15, antenna 16 and receiver 17 of the base station radar unit 1.

The vehicle-mounted radar unit 3 further comprises a demodulator 38 that demodulates question codes contained in the signals transmitted by the base station radar unit 1, question code decoder 39 that decodes demodulated question codes, question/response data bases 40a, 40b, 40c that output corresponding response data based on question codes decoded by the question code decoder 39, and a response code generator that generates response codes based on the decoded question codes and response data output by the question/response data bases 40a, 40b, 40c.

Figure 3:
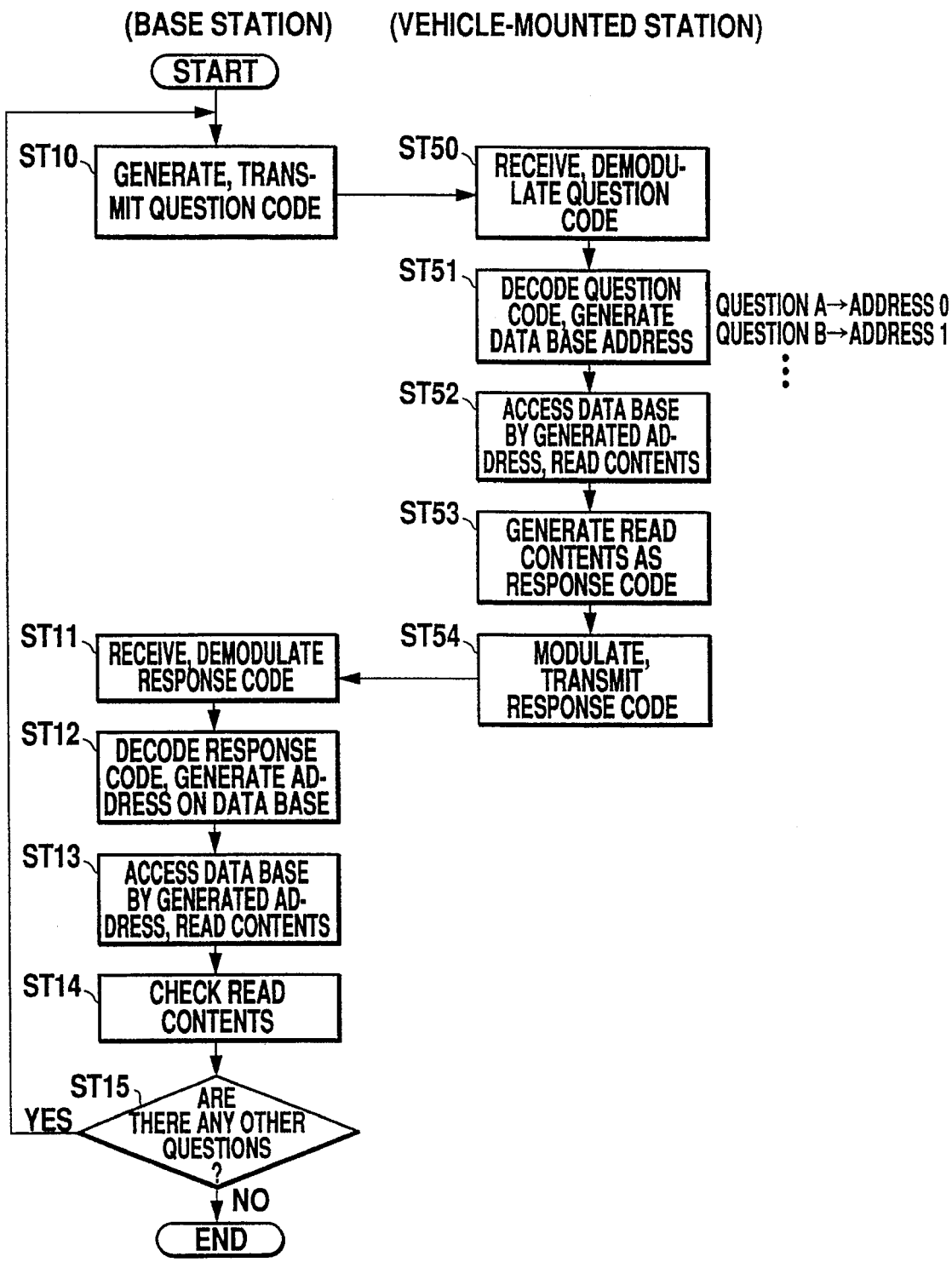
FIG. 3 is a flowchart showing the processing performed by a vehicle ID radar system according to the first embodiment of this invention.

FIG. 3 is a flowchart showing the question and response exchange that takes place between the base station radar unit 1 and vehicle-mounted radar unit 3.

Next, the operation of this vehicle ID radar system according to the first embodiment will be described.

Figure 29:
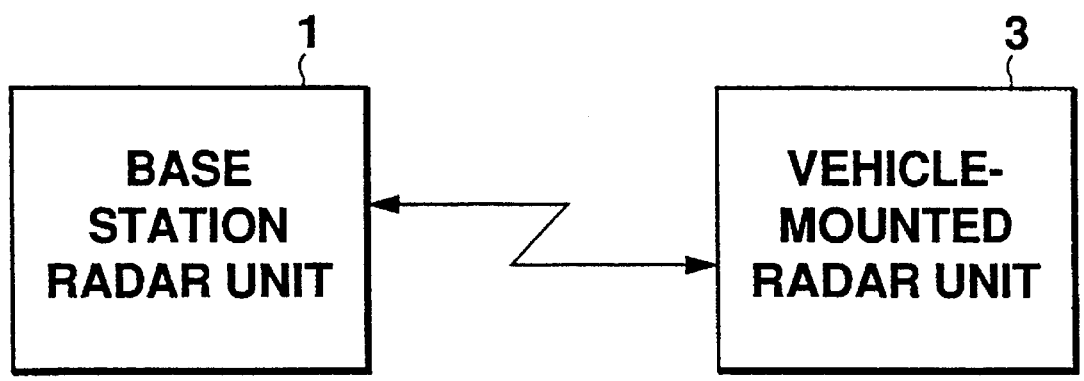
FIG. 29 is a conceptual, schematic drawing of a vehicle ID radar system.
Figure 30:
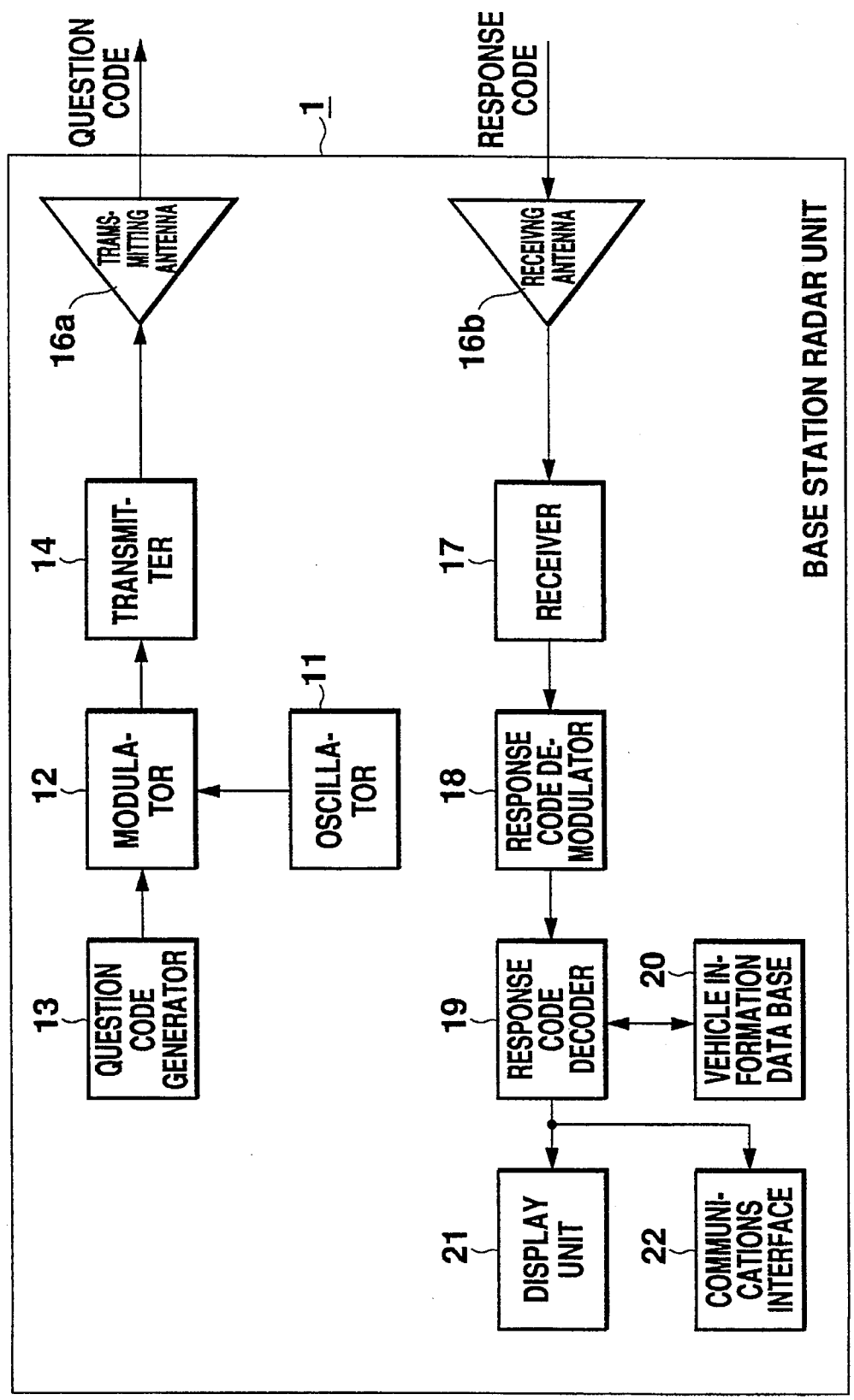
FIG. 30 is a schematic drawing of a conventional base station radar unit.
Figure 31:
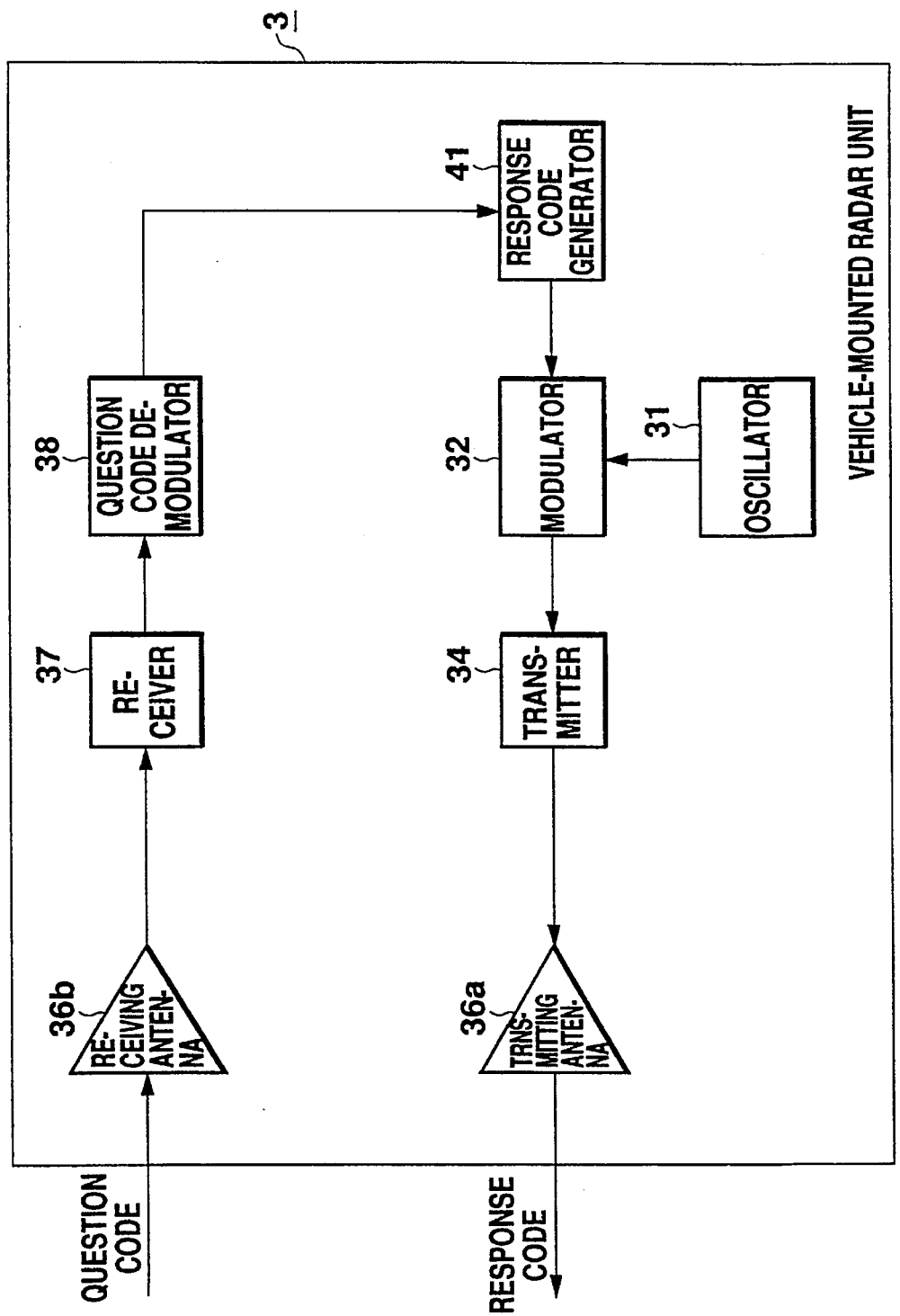
FIG. 31 is a schematic drawing of a conventional vehicle-mounted radar unit.
Figure 32:
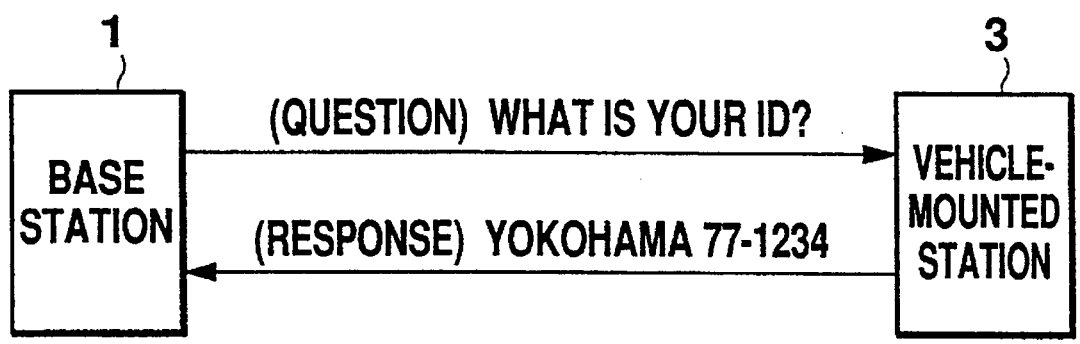
FIG. 32 is a drawing showing typical questions and responses in a conventional vehicle ID radar system.

The vehicle ID radar system according to the first embodiment comprises the base station radar unit 1 and vehicle-mounted radar unit 3 as shown in FIG. 29. The base station radar unit 1 is for example installed in the vicinity of the toll point on a highway. It issues predetermined questions to the vehicles that pass through, and by decoding the responses to these questions, performs vehicle identification and toll charge procedures. The vehicle-mounted radar unit 3 in this vehicle ID radar system generates predetermined responses to the questions from the base station radar unit 1, and returns them to the unit 1. From the viewpoint of question and response exchange, this vehicle ID radar system is a type of secondary radar.

The operation of the base station radar unit 1 will now be described in more detail with reference to FIG. 1 and FIG. 3.

When it is detected that a vehicle is approaching, the question code generator 13 generates a question for the vehicle. This question code is modulated by the modulator 12, and transmitted to the vehicle-mounted radar unit 3 via the transmitter 14, transmit/receive switch 15 and antenna 16 (ST10 in FIG. 3)

In response to the transmitted question code, the vehicle-mounted radar unit 3 returns a predetermined response code.

The operation of the vehicle-mounted radar unit 3 will be described hereinafter. The signal transmitted by the vehicle-mounted radar unit 3 is received by the antenna 16, and input to the receiver 17 via the send/receive switch 15. The response code demodulator 18 then demodulates the response code based on the output of the receiver 17 (ST11 in FIG. 3)

The response code decoder 19 decodes the demodulated response signal, and generates an address signal for reading the vehicle information data base 20 (ST12 in FIG. 3).

Based on this address signal, the response code decoder 19 reads corresponding vehicle information (ST13 in FIG. 3). As an example, the response code might be converted into various vehicle information such as vehicle registration number, vehicle type, owner's name, last vehicle inspection, last overhaul and accident history. Based on this decoded data, the decoder 19 checks whether or not the vehicle is illegal or stolen, and performs processing of the toll charge (ST14 in FIG. 3). When there are other questions, the routine returns to the first step ST10, and the question sequence is repeated. When there are no other questions, the routine is terminated.

The results of processing by the decoder 19 are displayed on the display unit 21, and output to the communications interface 22 that handles communication with other instruments.

Next, the operation of the vehicle-mounted radar unit 3 will be described in detail with reference to FIG. 2 and FIG. 3.

Signals related to question codes radiated by the base station radar unit 1 are received by the antenna 36, and input to the receiver 37 via the send/receive switch 35. The question code demodulator 38 demodulates the question codes based on the output of the receiver 37 (ST50 in FIG. 3). The question code decoder 39 decodes the demodulated question codes, and generates an address for reading corresponding data from the question/response data bases (40a–40c) (ST51 in FIG. 3). These decoded results and address signals are output to the question/response data bases 40a–40c and to the response code generator 41.

Various information related to the vehicle on which the radar unit 3 is mounted, such as vehicle registration number, vehicle type, owner's name, last vehicle inspection, last overhaul and accident history, are pre-stored in the question/response data bases 40a–40c. As an example, data concerning vehicle number might be stored in the data base 40a, data concerning vehicle type (passenger car, bus, truck, etc.) might be stored in the data base 40b, and data concerning the vehicle's owner might be stored in the data base 40c.

When the question codes from the decoder 39 correspond with the codes in the data bases 40a–40c, the data is read and output to the response code generator 41 (ST52 in FIG. 3).

The response code generator 41 generates, as a response code, a response corresponding to the details of the question code based on the question codes output by the decoder 39 and data output by one of the data bases 40a–40c (ST53 in FIG. 3).

This response code is input to the modulator 32, and modulated. It is then transmitted to the base station radar unit 1 via the transmitter 34, transmit/receive switch 35 and antenna 36 (ST54 in FIG. 3).

Figure 4:
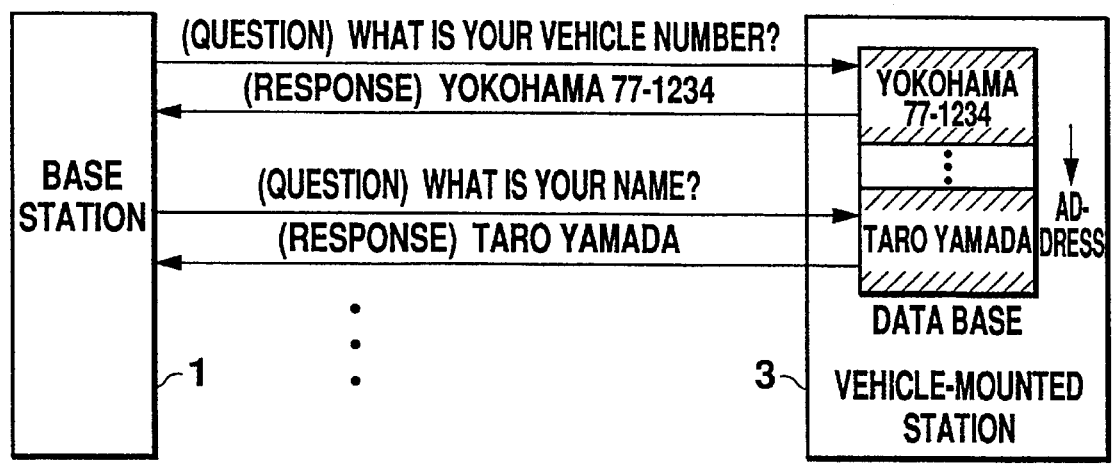
FIG. 4 is a drawing showing typical questions and responses according to the first embodiment of this invention.

FIG. 4 shows a typical example of the aforesaid question and response sequence. In the figure, to the first question "what is your vehicle number?", a response of "Yokohama 77-1234" might be given based on the data in the data base 40a, and to the next question "What is your name?", a response of, for example "Taro Yamada" might be given based on the data in the data base 40c.

Hence, by checking the responses to a plurality of questions, even if some data base in the vehicle-mounted radar unit has been tampered with, illegal use of a vehicle can be detected by comparing other data bases that have not been altered.

For example, assume that the correct vehicle number and owner are respectively "Yokohama 77-1234" and "Taro Yamada", and that the vehicle number has been altered to "Yokohama 11-1111". The base station radar unit 1, by performing the processing shown in FIG. 3, detects that the owner and vehicle number do not correspond.

In this way, illegal use of the vehicle is prevented.

It will of course be understood that the number of question/response data units is not limited to three as shown in FIG. 2, it being possible to use 2, 4, 5 etc. Further, these units need not be separate memories, but may also be formed by partitioning the memory space in one memory.

Embodiment 2

According to the first embodiment, the contents of the question/response data bases 40a–40c in the vehicle-mounted radar unit 3 were pre-stored, and were not updated. However, a data base updating unit that updates the contents of these data bases may also be provided in the vehicle-mounted radar unit 3.

Figure 5:
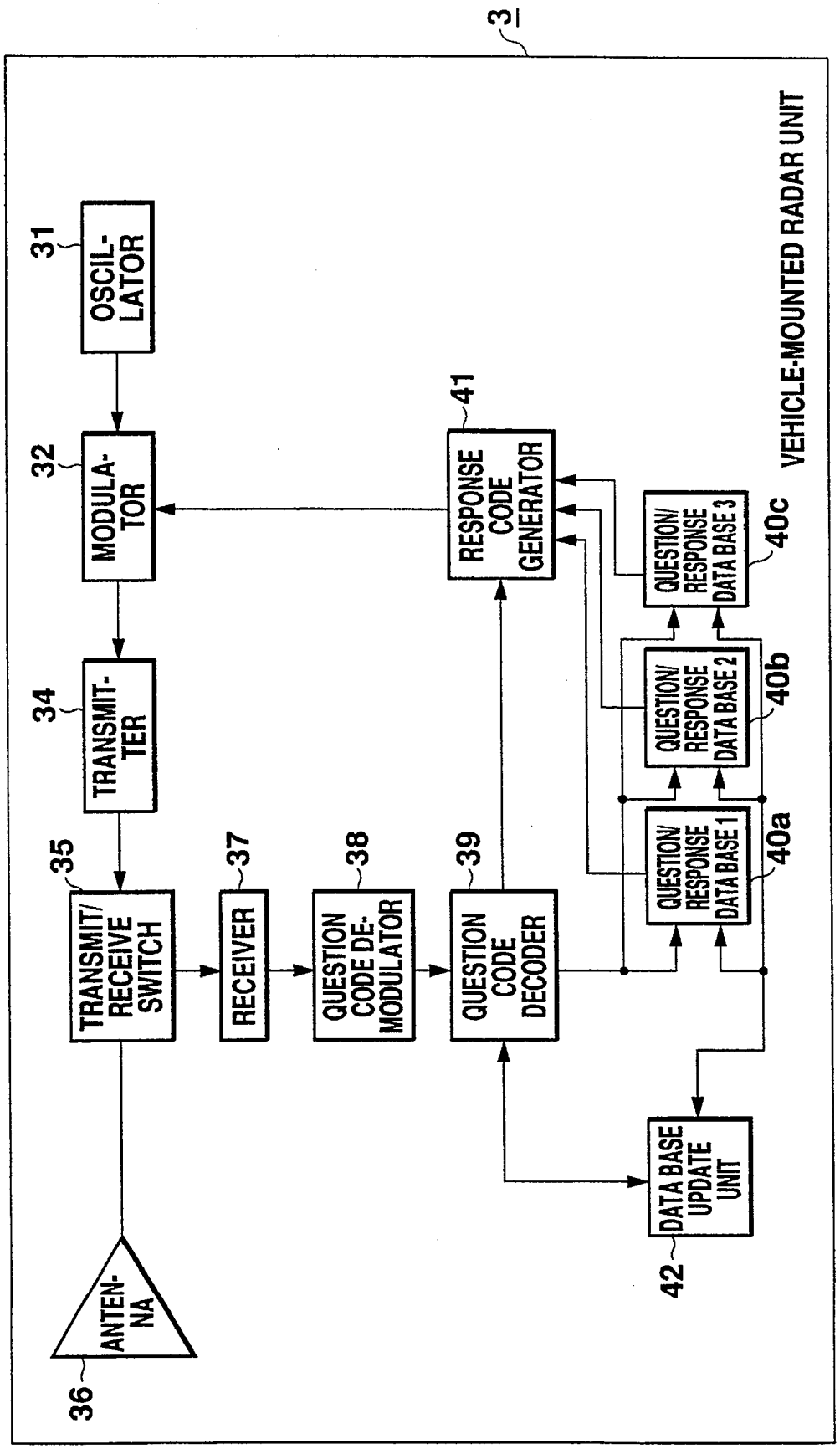
FIG. 5 is a schematic drawing of a vehicle-mounted radar unit according to a second embodiment of this invention.

The construction of the vehicle-mounted radar unit according to the second embodiment is shown in FIG. 5. In the figure, a data base updating unit 42 has been added to the vehicle-mounted radar unit of the first embodiment. The data base updating unit 42 updates the data bases 40a–40c based on the question codes decoded by the decoder 39. The remaining features of the construction are identical to those of the first embodiment.

Figure 6:
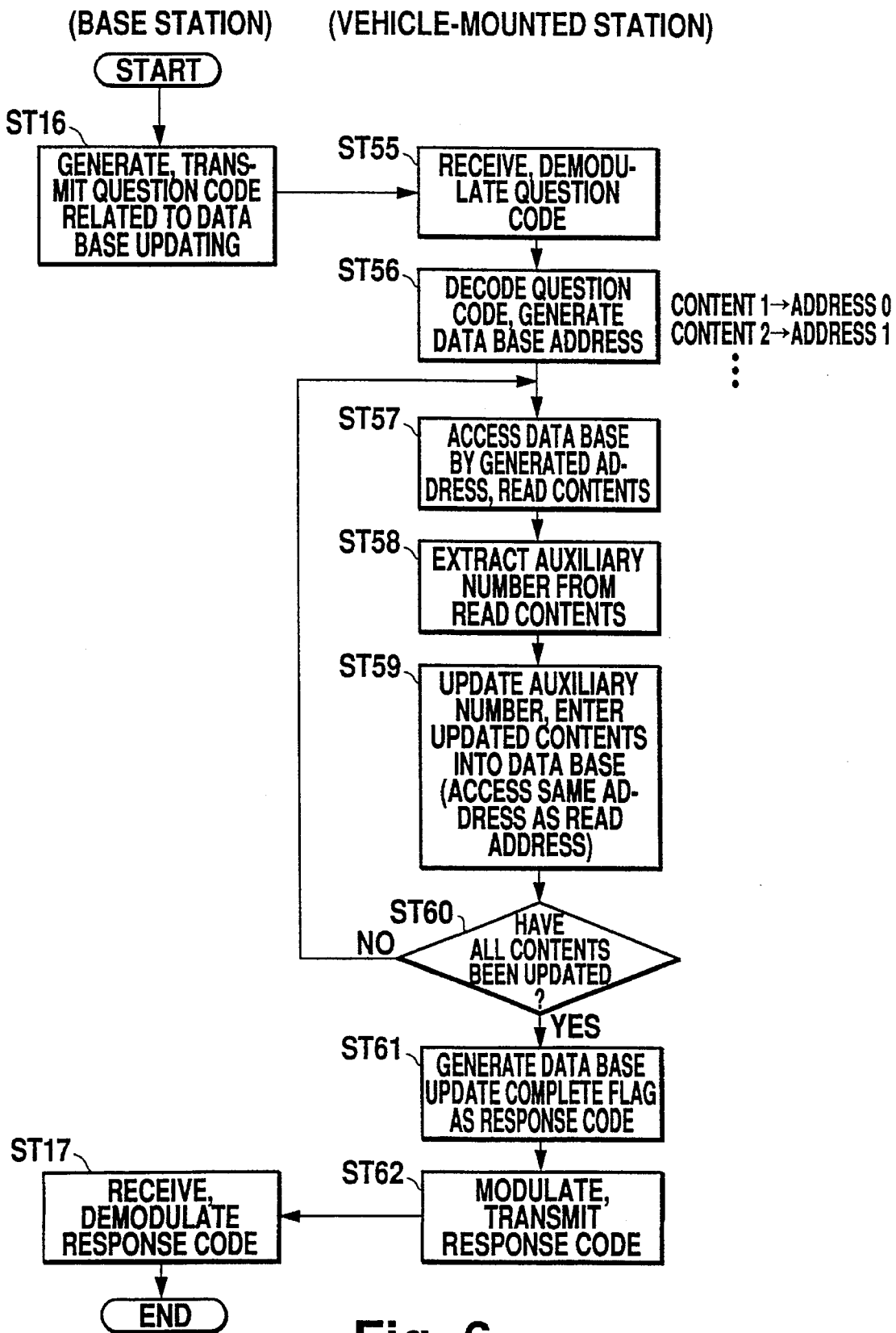
FIG. 6 is a flowchart showing the processing performed by a vehicle ID radar system according to the second embodiment of this invention.

FIG. 6 is a processing flowchart.

Next, the operation of the vehicle-mounted radar unit 3 according to the second embodiment will be described. As the basic operation is the same as that of the first embodiment, this description will focus on a data base updating unit 4 that is different from the first embodiment. In the following, an example is given where the data base is updated by modifying a data auxiliary number (number or symbol for managing data such as A, B, C . . . ), When it is desired to update a data base, the base station radar unit 1 transmits a predetermined updating question code (ST16 in FIG. 6).

The receiver 37 and question code demodulator 38 of the vehicle-mounted radar unit 3, receive and demodulate the question code (ST55 in FIG. 6).

The decoder 39 decodes the question code, and generates a data base address for updating the contents (ST56 in FIG. 6).

The updating unit 42 reads the data base contents of the address specified by the decoder 39 (ST57 in FIG. 6).

The updating unit 42 extracts the auxiliary number from the read contents (ST58 in FIG. 6).

The updating unit 42 updates the auxiliary number based on the question code decoded by the decoder 39, and reads the updated contents into the data base (ST59 in FIG. 6).

When all the contents specified by the question code have been updated, the routine proceeds to a next step ST61, otherwise the routine returns to the step ST57 and the processing of the steps ST57–ST59.

When the updating of the data base is complete, the decoder 39 generates a data base update complete flag as a response code, and outputs it to the response code generator 41 (ST61 in FIG. 6).

This response code is modulated and transmitted to the base station radar unit 1 (step ST62 in FIG. 6).

In the base station radar unit 1, the response code is received and demodulated (ST17 in FIG. 6).

Figure 7:
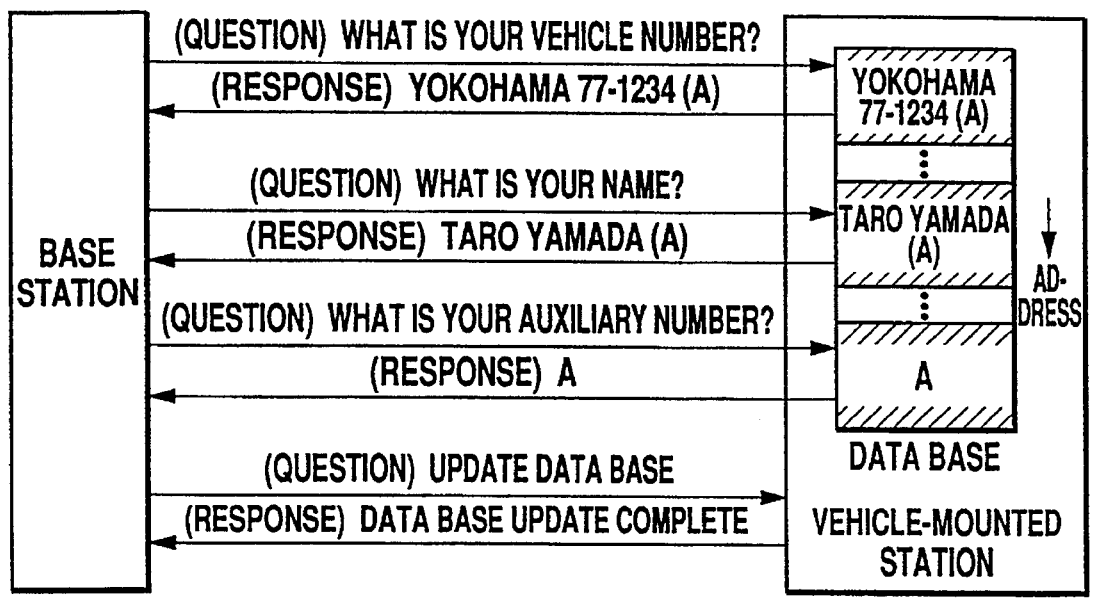
FIG. 7(a) is a drawing showing typical questions and responses according to the second embodiment of this invention.
FIG. 7(b) is a drawing showing typical questions and responses according to the second embodiment of this invention.
Figure 7:
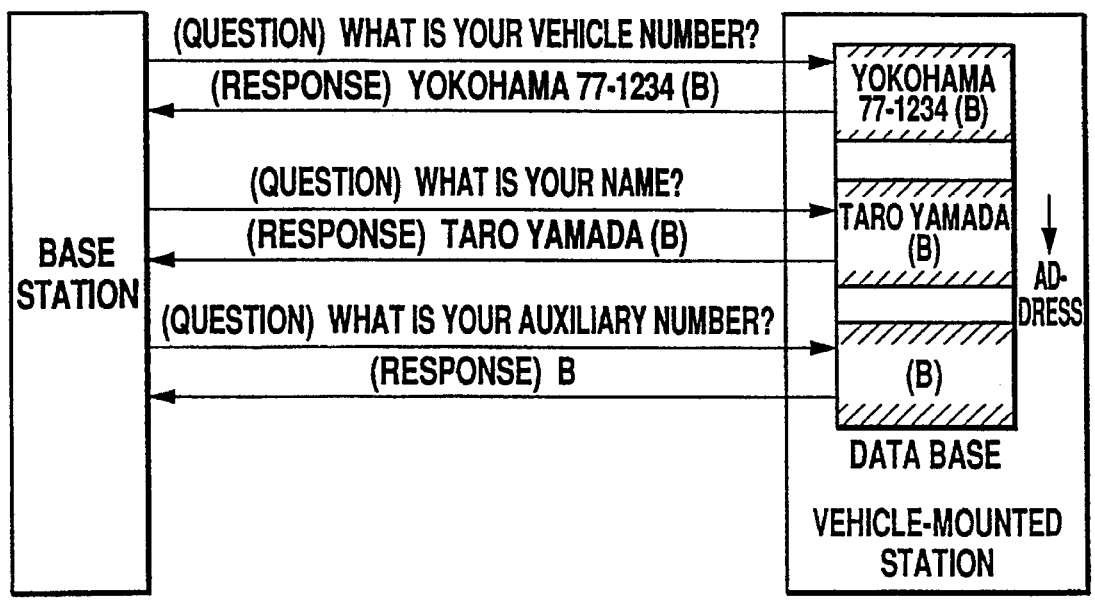

Examples of question and response sequences before and after updating are given respectively in FIG. 7(*a*) and FIG. 7(*b*).

FIG. 7(*a*) shows a case where, in response to a first question "What is your vehicle number?", a response of "Yokohama 77-1234 (A)" might be given based on the data base 40*a*, and in response to a second question "What is your name?", a response of "Taro Yamada (A)" might be given based on the data base 40*b*. In response to a third question "What is your auxiliary number? ", a response of "A" might be given based on the data base 40*c*.

A fourth question (command) "Update data base" is then issued, and after updating is complete, a response "data base update complete" is returned.

FIG. 7(*b*) shows a case where, in response to a first question "What is your vehicle number?", a response of "Yokohama 77-1234 (B)" might be given based on the data base 40*a*, and in response to a second question "What is your name?", a response of "Taro Yamada (B)" might be given based on the data base 40*b*. In response to a third question "What is your auxiliary number?", a response of "B" might be given based on the data base 40*c*.

As will be understood from the foregoing description, updating is performed not only on some data bases, but on all of them. Consequently, provided that the vehicle-mounted radar unit 1 is used correctly, the auxiliary numbers of the responses must coincide.

Hence, as in the case of the first embodiment, by checking the responses to a plurality of questions, even if some data base in the vehicle-mounted radar unit has been tampered with, an illegal vehicle can be detected by comparing other data bases that have not been altered. For example, assume that the correct vehicle number and owner are respectively "Yokohama 77-1234 (B)" and "Taro Yamada (B)", and that the vehicle number has been wrongfully altered to "Yokohama 11-1111 (B)" or "Yokohama 77-1234 (A)". In the former case, the auxiliary numbers coincide but the main parts of the vehicle number does not, while in the latter case, the main parts of the number coincide but the auxiliary numbers do not. In either of these cases, the base station radar unit 1 detects an inconsistency in the plurality of response data, so illegal use of the vehicle can be prevented.

Further, according to the second embodiment, even if all the data bases (e.g. 40*a*–40*c* in FIG. 5) have been tampered with, illegal use of the vehicle can still be prevented. For example, after the contents of all the data bases are altered, the auxiliary numbers in these data bases will not coincide with the latest auxiliary numbers stored in the data base in the base station radar unit 1 when the real owner's vehicle information data base is updated. The base station radar unit 1 is thus able to detect that information has been tampered with. This also means that strict limitation of access to any data base by an ordinary user can be relaxed, and that the construction of the data bases in the vehicle-mounted radar unit 3 can be simplified.

In the above description, an example was given where updating of the data base was performed by updating an auxiliary number separate from the main data. This is not the only possible arrangement, and the main data itself may also be updated. However, an auxiliary number is updated by the base station relatively easily and in a short time (e.g. the auxiliary number might be the number of times the vehicle passes a certain point, and updated each time it passes near the base station), so persons attempting to use the vehicle illegally can easily be prevented from knowing the correct auxiliary number. For this reason, it may be said that updating of an auxiliary number provides a greater measure of security than updating the main data.

Embodiment 3

In the aforesaid first and second embodiments, a response code was received in response to a question code using secondary radar so as to obtain vehicle information, however the base station may be provided also with primary radar functions so as to determine the distance from the vehicle, the vehicle's speed, and the vehicle's RCS (Radar Cross Section). In this case, the vehicle-mounted radar unit may comprise an instrument interface for obtaining information from instruments (e.g. a speedometer) mounted on the vehicle, and this information can then be transmitted.

Figure 8:
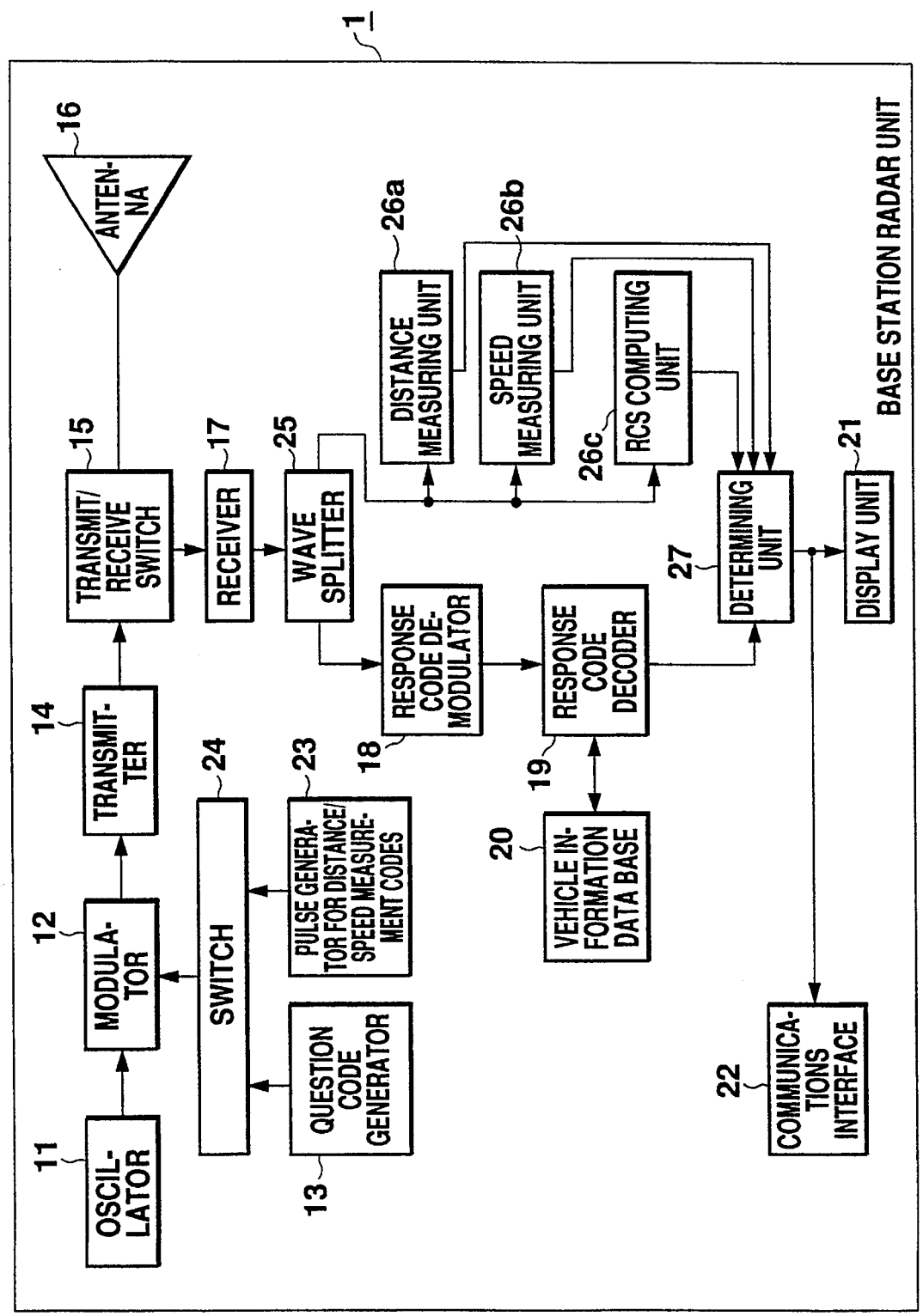
FIG. 8 is a schematic drawing of a base station radar unit according to a third embodiment of this invention.

FIG. 8 shows the construction of the base station radar unit 1 according to a third embodiment. The base station radar unit 1 shown in FIG. 1 further comprises a distance-measuring and speed-measuring pulse generator 23 that generates pulses for primary radar operation, a switch 24 for selecting either a pulse for primary radar operation or a question code for secondary radar operation, and supplying the selected output to the modulator 12, a wave splitter 25 for supplying a signal received from the vehicle-mounted radar station to a distance-measuring unit 26*a*, speed-measuring unit 26*b* and RCS computing unit 26*c* for primary radar operation or to the response code demodulator 18 for secondary radar operation, the measuring instrument 26*a* that measures the distance from the vehicle, the speed-measuring unit 26*b*, the RCS computing unit 26*c*, and a determining unit 27 that identifies the vehicle and determines whether or not the vehicle-mounted instruments are accurate and functioning normally by comparing vehicle information decoded by the response code decoder 19 with vehicle information obtained from the distance-measuring unit 26*a*, speed-measuring unit 26*b* and RCS computing unit 26*c*.

The wave splitter 25 selectively supplies the received signal either to a primary radar block or a secondary radar block, however it may also be supplied to both of these simultaneously.

The oscillator 11, question code generator 13, transmitter 14, transmit/receive switch 15, antenna 16, receiver 17, response code demodulator 18, response code decoder 19, vehicle information data base 20, display unit 21 and communications interface 22 are the same as in FIG. 1.

Figure 9:
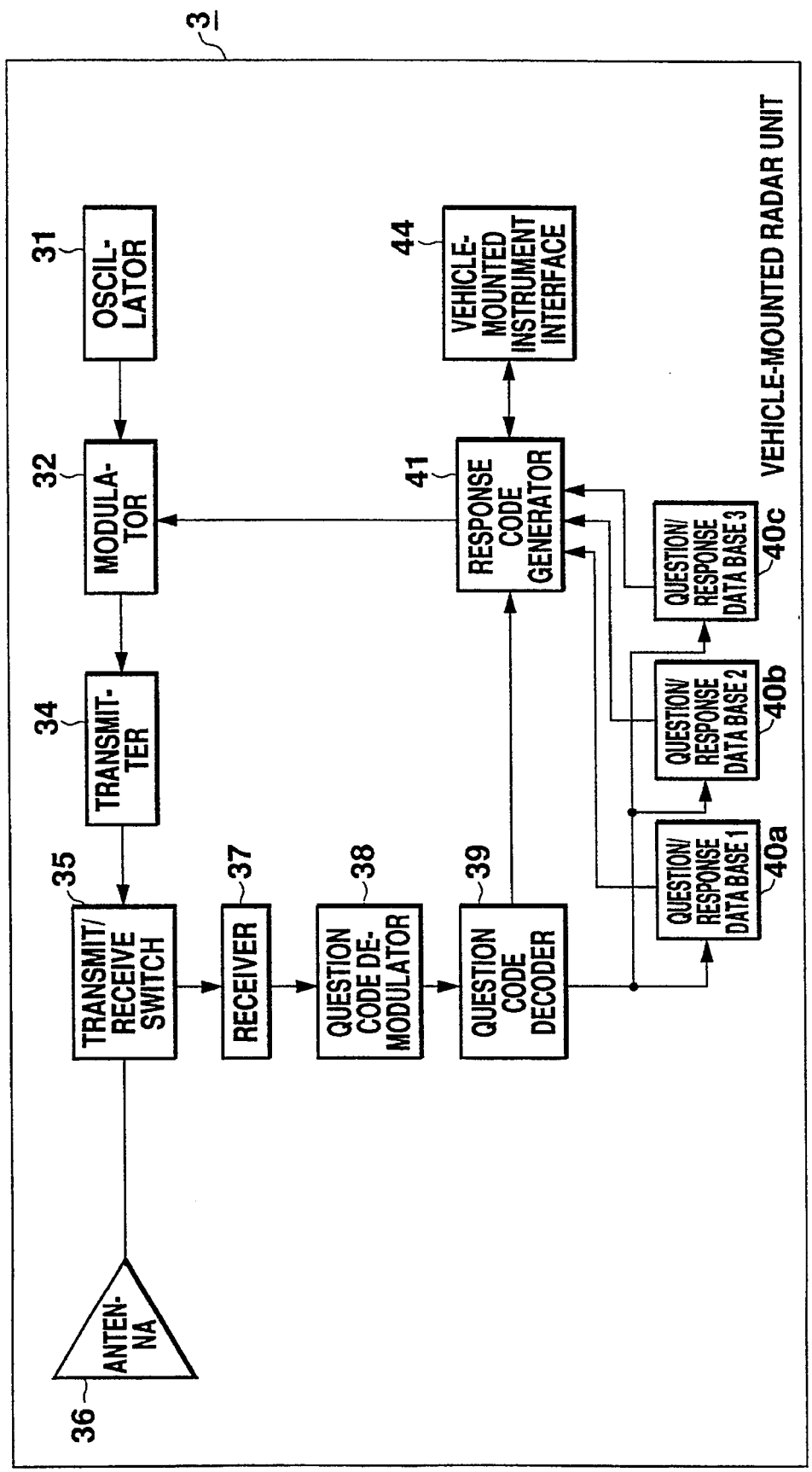
FIG. 9 is a schematic drawing of a vehicle-mounted radar unit according to the third embodiment of this invention.

FIG. 9 shows the construction of the vehicle-mounted radar unit 3 according to the third embodiment. In the figure, the vehicle-mounted radar unit according to the first embodiment is further provided with a vehicle-mounted instrument interface 44.

The interface 44 receives data from vehicle-mounted instruments, not shown (e.g. a speedometer, distance meter and tachometer, etc.), and supplies it to the response code generator 41. The response code generator 41 transmits this information together with response codes corresponding to the question codes.

Figure 10:
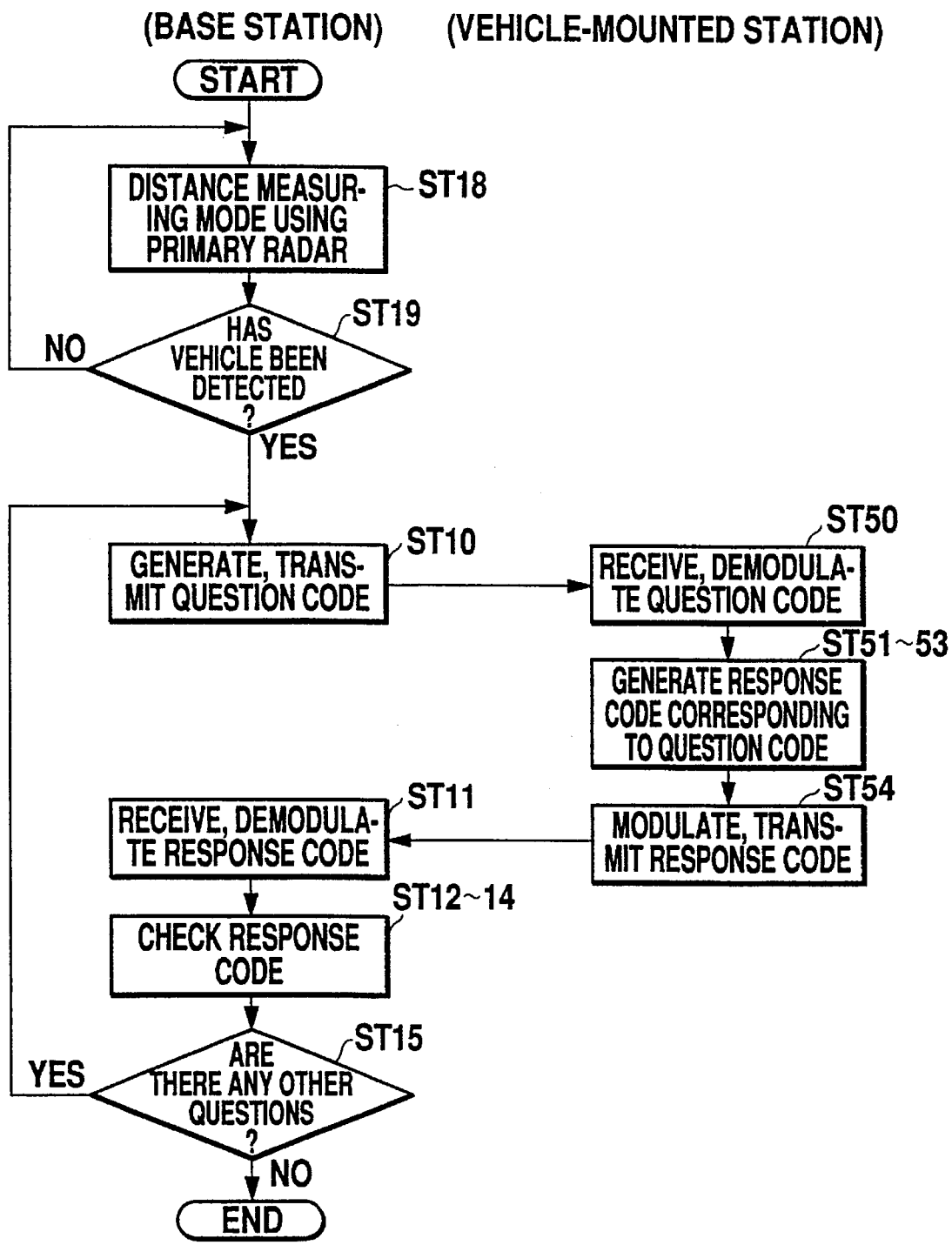
FIG. 10 is a flowchart showing the processing performed by a vehicle ID radar system according to the third embodiment of this invention.

FIG. 10 is a flowchart of this processing.

Next, the operation will be described.

Figure 11:
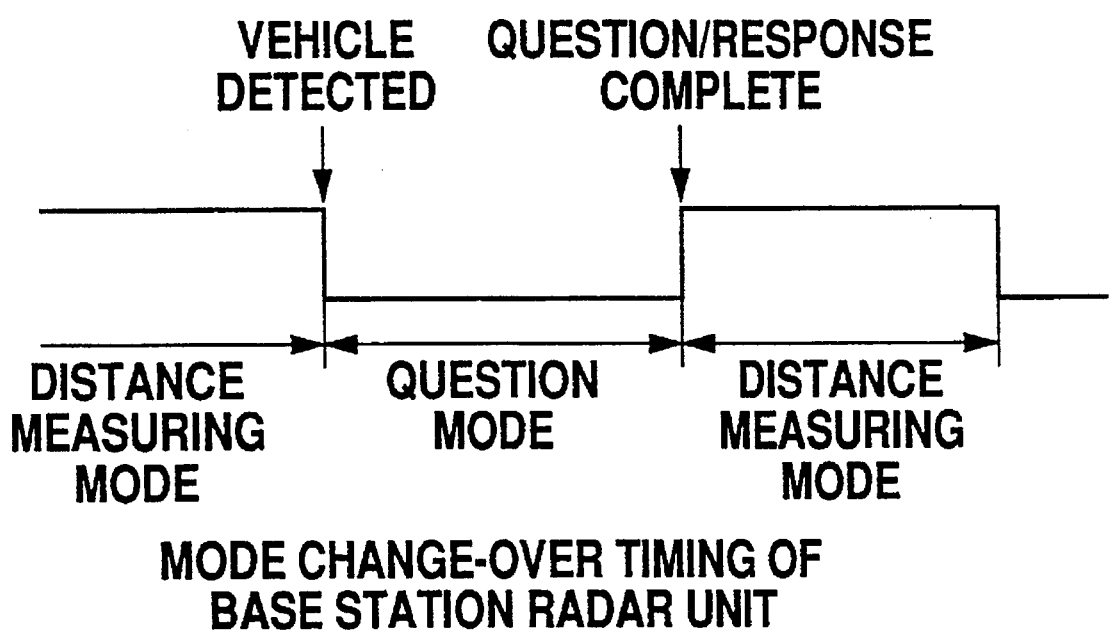
FIG. 11 is a drawing showing a change-over timing between a distance-measuring mode and a question mode according to the third embodiment of this invention.

The vehicle ID radar system according to the third embodiment first alternates between primary radar operation and secondary radar operation. FIG. 11 is a typical timing chart of this operation.

FIG. 11 shows that operation is first performed in a mode in which the distance from a vehicle and its speed (hereinafter referred to as "distance-measuring mode", primary radar operation) are measured, and when a vehicle is detected, operation switches over to a question/response mode (hereinafter referred to as "question mode", secondary radar operation). When the questions and responses have been completed, the system returns to the distance-measuring mode. The change-over between these modes takes place in the switch 24 and wave splitter 25, and vehicle detection takes place in the distance/speed measuring pulse generator 23, distance measuring instrument 26a, speed-measuring unit 26b and RCS computing unit 26c that perform primary radar operations. The switch 24 is changed over by the output of the determining unit 27 that receives the primary radar output.

The secondary radar operation according to the third embodiment is the same as that of the first and second embodiments, except that vehicle RCS and speedometer data for the vehicle-mounted unit itself are contained in the response codes.

Next, the operation will be described for the case when vehicle detection, and vehicle distance and speed measurement, are performed by means of primary radar.

The switch 24 selects a distance/speed measuring pulse generated by the distance/speed measuring pulse generator 23. The modulator 12 modulates the output signal from the oscillator 11 by this distance/speed measuring pulse, and the result is output to the transmitter 14. The transmitter 14 radiates the modulated signal, via the send/receive switch 15, to the vehicle from the antenna 16. This operation is the distance-measuring mode using primary radar (ST18 in FIG. 10), and this mode continues until the vehicle is detected (ST19 in FIG. 10). The subsequent operations of the base station radar unit 1 (ST10–15 in FIG. 10) and operations of the vehicle-mounted radar unit 3 (ST50–54) in FIG. 10 are the same as in the first embodiment.

The signal reflected by the vehicle is received by the antenna 16, and is input to the receiver 17 via the transmit/receive switch 15. The received signal passes the wave splitter 25, and is input to the distance-measuring unit 26a, speed-measuring unit 26b and RCS computing unit 26c on the primary radar side.

The distance-measuring unit 26a calculates the distance from the vehicle. If the time from when the transmitting signal is transmitted to when the reflected wave is received is $\Delta t$, and the speed of light c is $(3\times 10^8)$ m/s, the distance R to the vehicle is given by $c.\Delta t/2$.

The speed-measuring unit 26b calculates the speed of the vehicle. If the transmitting wavelength is $\lambda$ and the Doppler frequency of the vehicle is fd, the speed v of the vehicle is $\lambda.fd/2$.

The RCS computing unit 26c measures the level of the received signal, and calculates an RCS corresponding to the size of the vehicle by multiplying? this value by a predetermined coefficient. This predetermined coefficient is determined by radar equations based on the antenna gain, transmitting power, receiver gain and distance from the vehicle.

The determining unit 27 compares the vehicle RCS obtained from the RCS computing unit 26c with the vehicle RCS obtained from the response code decoder 19. If these RCS are the same, it can be said that the vehicle number and vehicle correspond, and the vehicle can be said to have been identified correctly. On the other hand, if the RCS are not the same (for example, although the vehicle is an ordinary passenger car according to the vehicle information data base 20, the measured RCS is that of a large vehicle such as a bus), it cannot be said that the vehicle was identified correctly. It can consequently be concluded that the vehicle-mounted radar unit may have been stolen or tampered with.

By comparing the vehicle speed measured by the primary radar with the speed limit on the road where the base station radar unit 1 is installed, the determining unit 27 also determines whether or not the vehicle's speed is authorized. More specifically, the speed output by the speed-measuring unit 26b is compared with the speed limit stored in the vehicle information data base 20.

Further, by comparing a value of a vehicle-mounted instrument obtained by the secondary radar with the vehicle speed measured by the primary radar side, the precision of this instrument can be evaluated, and it can be determined whether or not the instrument is functioning correctly. This is made possible by providing a vehicle-mounted instrument interface 44 so that data from the vehicle's speedometer are included in the response codes in the vehicle-mounted radar unit 3. The operation of the vehicle-mounted interface 44 is described hereinafter.

Still further, by comparing the result of the primary radar with the response of the secondary radar, it can be determined whether or not the vehicle-mounted radar unit 3 has a fault. For example, when a vehicle is detected by the primary radar and there is no reply from the vehicle to questions about the vehicle's number or owner's name, it is determined that the vehicle mounted radar unit 3 is faulty.

These determining results obtained by the instrument 27 are displayed by the display unit 21, and sent to other instruments via the communications interface 22.

Next, the operation of the vehicle-mounted radar unit 3 according to the third embodiment will be described, but as the basic operation is the same as that of the first embodiment, the description will focus on the vehicle-mounted instrument interface 44.

When a question code that reads a value of a vehicle-mounted instrument such as a speedometer is input, the response code generator 41 generates a response code via the interface 44 based on the value of the vehicle-mounted instrument.

If a question code is input from the base station radar unit 1 that produces a predetermined display on the vehicle instruments (e.g. "the speed limit has been exceeded", or "a vehicle instrument is faulty"), the response code generator 41 produces a predetermined display on the instruments via the interface 44.

Hence, according to the third embodiment, the radar system has the following advantages in addition to the feature of preventing illegal use of the vehicle specified in the first embodiment.

First, primary radar was added to the base station radar unit, so the distance to the vehicle and vehicle speed can be calculated.

Further, by calculating a vehicle RCS using primary radar and comparing it with a pre-stored vehicle RCS, it can be determined by the base station radar unit whether or not there has been illegal use of the vehicle.

Further, by comparing the vehicle speed calculated using primary radar with a pre-stored speed limit, speed limit violations can be detected.

Further, by including instrument data in the response codes from the vehicle-mounted radar unit, and comparing this instrument data with the real vehicle speed obtained by the primary radar, the vehicle instruments can be checked, and the result displayed by the vehicle instruments. If the speed exceeds the speed limit, this fact can also be displayed on the vehicle instruments together with a warning.

Further, by detecting whether or not there is a response from the vehicle-mounted radar unit, the vehicle-mounted radar unit can be checked for faults.

Embodiment 4

According to the aforesaid third embodiment, the distance-measuring unit 26a, speed-measuring unit 26b and RSC computer 26c constituting the primary radar operate continuously in the distance-measuring mode. The processing load may however be reduced by performing primary radar signal processing only when a vehicle is detected.

Figure 12:
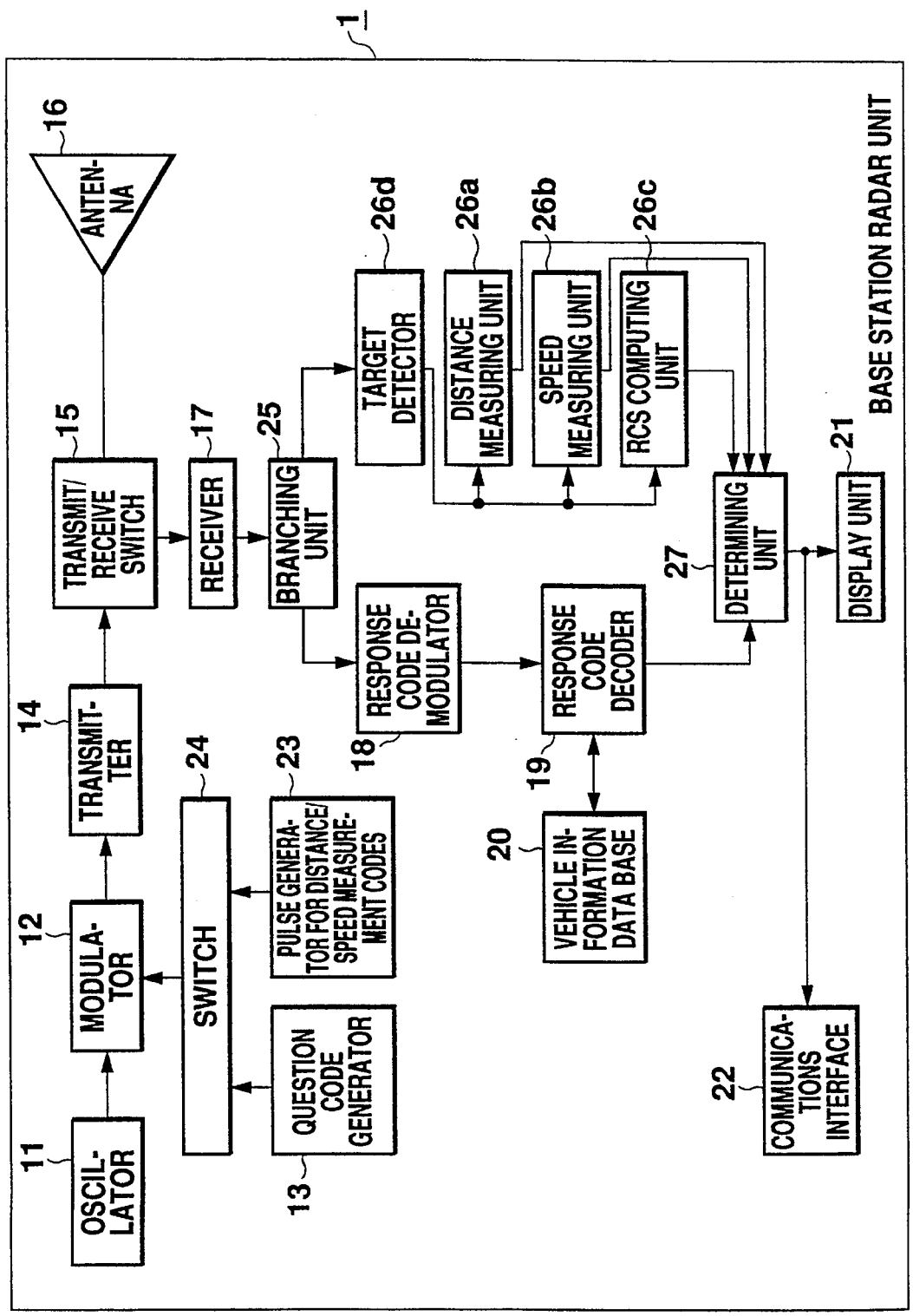
FIG. 12 is a schematic drawing of a base station radar unit according to a fourth embodiment of this invention.

FIG. 12 shows the construction of the base station radar unit according to a fourth embodiment. In the figure, a target detector 26d has been added to the base station radar unit 1 of the third embodiment shown in FIG. 8. This target detector 26d detects whether or not a vehicle is present when the distance-measuring mode is operating.

The operation of the base station radar unit 1 according to the fourth embodiment will now be described, however as the basic operation is the same as that of the third embodiment, the description will focus mainly on the target detector 26d which is different from the third embodiment.

Primary radar operates in the distance-measuring mode. The signal received from the receiver 17 is input to the target detector 26d via the wave splitter 25, but is not directly input to the distance-measuring unit 26a, speed-measuring unit 26b or RSC computer 26c. When the target detector 26d does not detect a vehicle, the target detector 26d does not output a receive signal to the distance-measuring unit 26a or other instruments, so these instruments do not perform any processing.

On the other hand, when the target detector 26d detects a vehicle, the target detector 26d outputs a receive signal to the distance-measuring unit and other instruments. The distance-measuring unit 26a and other instruments start processing at this time. The primary radar therefore operates only when a vehicle is detected.

According to the fourth embodiment, primary radar processing, i.e. computation of the distance from the vehicle, vehicle speed and vehicle RCS, is performed only when the target detector 26d detects a vehicle, so the processing load is reduced. As a result of this reduced processing load, the system can be made more compact and it can be simplified.

Embodiment 5

According to the third embodiment, primary and secondary radar were used to transmit and receive signals, however other sensors may be provided in addition to radar, and this data integrated with radar data to perform determinations.

Figure 13:
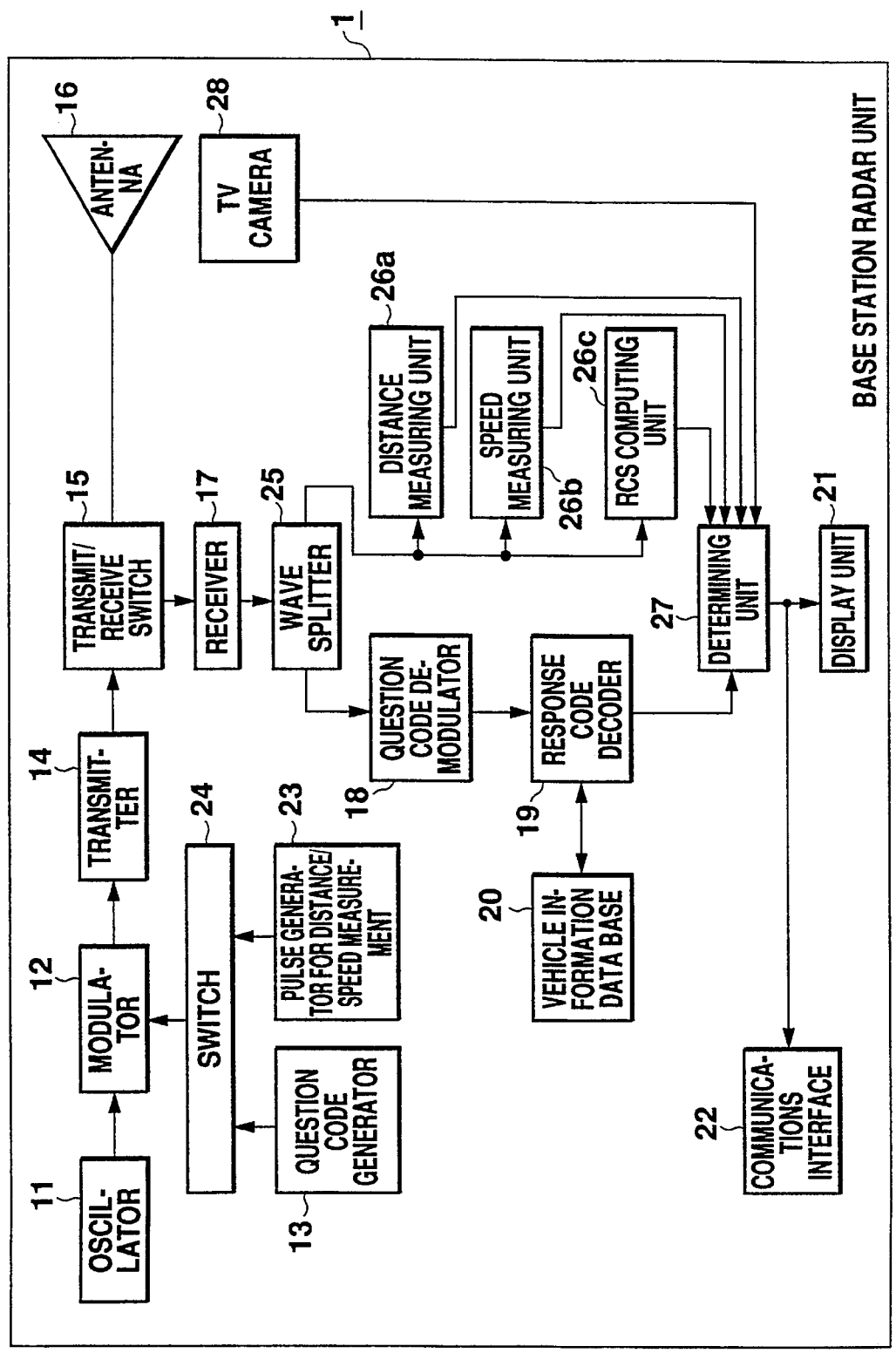
FIG. 13 is a schematic drawing of a base station radar unit according to a fifth embodiment of this invention.

FIG. 13 shows the construction of the base station radar unit 1 according to a fifth embodiment. In the figure, a TV camera 28 has been added to the base station radar unit of the third embodiment shown in FIG. 8. The TV camera 28 of FIG. 13 takes a picture of a vehicle number plate, and this data is output to the determining unit 27.

Next, the operation of the base station radar unit 1 according to the fifth embodiment will be described, but as the basic operation is the same as that of the fourth embodiment, the description will focus mainly on the TV camera 28 which is different from the fourth embodiment.

The TV camera 28 takes a picture of a vehicle number plate, and the image data is output to the determining unit 27.

According to the third embodiment, the determining unit 27 identifies the vehicle by comparing the vehicle RCS obtained by secondary radar with the vehicle RCS obtained from the RCS computing unit 26c. In the base station radar unit 1 according to the fifth embodiment, the determining unit 27 identifies the vehicle by comparing the vehicle number obtained by secondary radar with the vehicle number taken from the image of the number plate read by the TV camera 28. It is therefore possible to determine whether or not the number plate has been stolen or tampered with.

For example, if the vehicle number decoded by the decoder 19 is "Yokohama 77-1234" and the vehicle number taken from image data supplied by the TV camera 28 is "Yokohama 77-1234", i.e. the two numbers are identical, the determining unit 27 determines that no theft or misappropriation of the number plate has occurred. On the other hand, if the two are not identical, the determining unit 27 determines that the number plate was stolen or tampered with.

The determining unit 27 displays this determining result on the display unit 21 together with the other determining results described in the third embodiment. Simultaneously, the determining unit 27 outputs these determining results to the communications interface 22 in order to send them to other instruments.

As, according to the fifth embodiment, the vehicle is determined using a TV camera which is not a radar sensor, determining precision and reliability are higher than in the case where radar is used alone.

According to the fifth embodiment, a TV camera was taken as an example of a sensor that is not a radar device, however the number plate may be read with other sensors instead of a TV camera such as, for example, an infrared ray sensor or an ultrasonic wave sensor. Further, the vehicle information obtained by this non-radar sensor may be the length, breadth or weight of the vehicle, in which case an ultrasonic wave sensor or a weight sensor may be used.

Embodiment 6

According to the aforesaid first to fifth embodiments, the power supply for the vehicle-mounted radar unit 3 was supplied by a battery, not shown. However, it is sufficient if the vehicle-mounted radar unit 3 operates when it approaches the base station radar unit 1, so the power required for the vehicle-mounted radar unit can be supplied from the base station.

Figure 14:
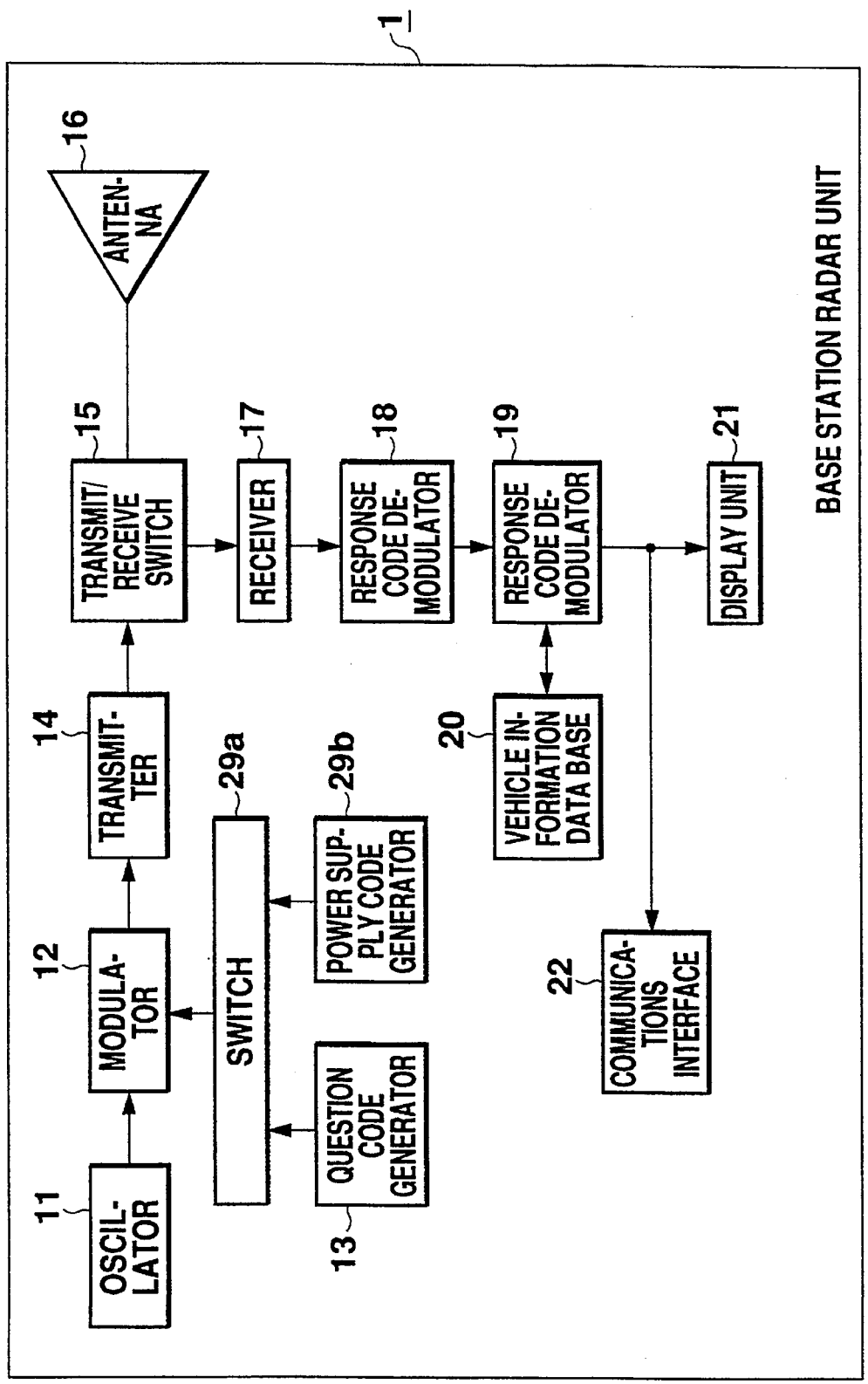
FIG. 14 is a schematic drawing of a base station radar unit according to a sixth embodiment of this invention.

FIG. 14 shows the construction of the base station radar unit 1 according to a sixth embodiment. In the figure, a switch 29a and power supply code generator 29b have been added to the vehicle-mounted radar unit according to the first embodiment shown in FIG. 1. The switch 29a selects the output of the power supply code generator 29b in a power supply mode, and this output is supplied to the modulator 12. The power supply code generator 20b generates a power supply code that commands the vehicle-mounted radar unit 3 to store power in the accumulator.

Figure 15:
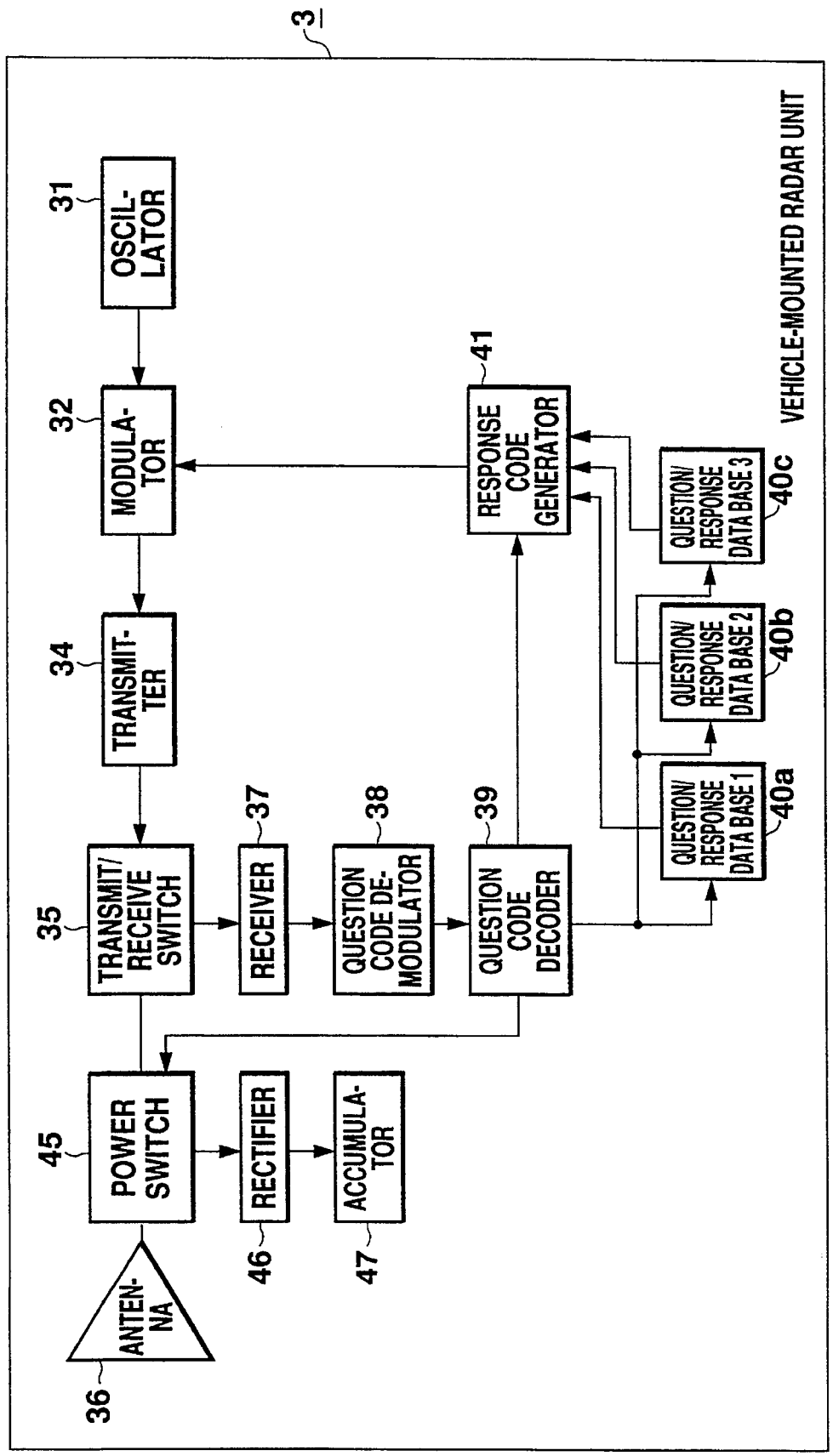
FIG. 15 is a schematic drawing of a vehicle-mounted radar unit according to the sixth embodiment of this invention.

FIG. 15 shows the construction of the vehicle-mounted radar unit 3 according to the sixth embodiment. The vehicle-mounted radar unit 3 in the figure comprises a power switch 45, rectifier 46 and accumulator 47 in addition to the radar unit shown in FIG. 2. When the vehicle-mounted radar unit 3 receives the power supply code, the power switch 45 supplies a signal received by the antenna 36 to the rectifier 46 based on the output of the question code decoder 39. The rectifier 46 rectifies the received signal and converts it to a direct current signal. The accumulator 47 stores power due to the signal output by the rectifier 46.

Figure 16:
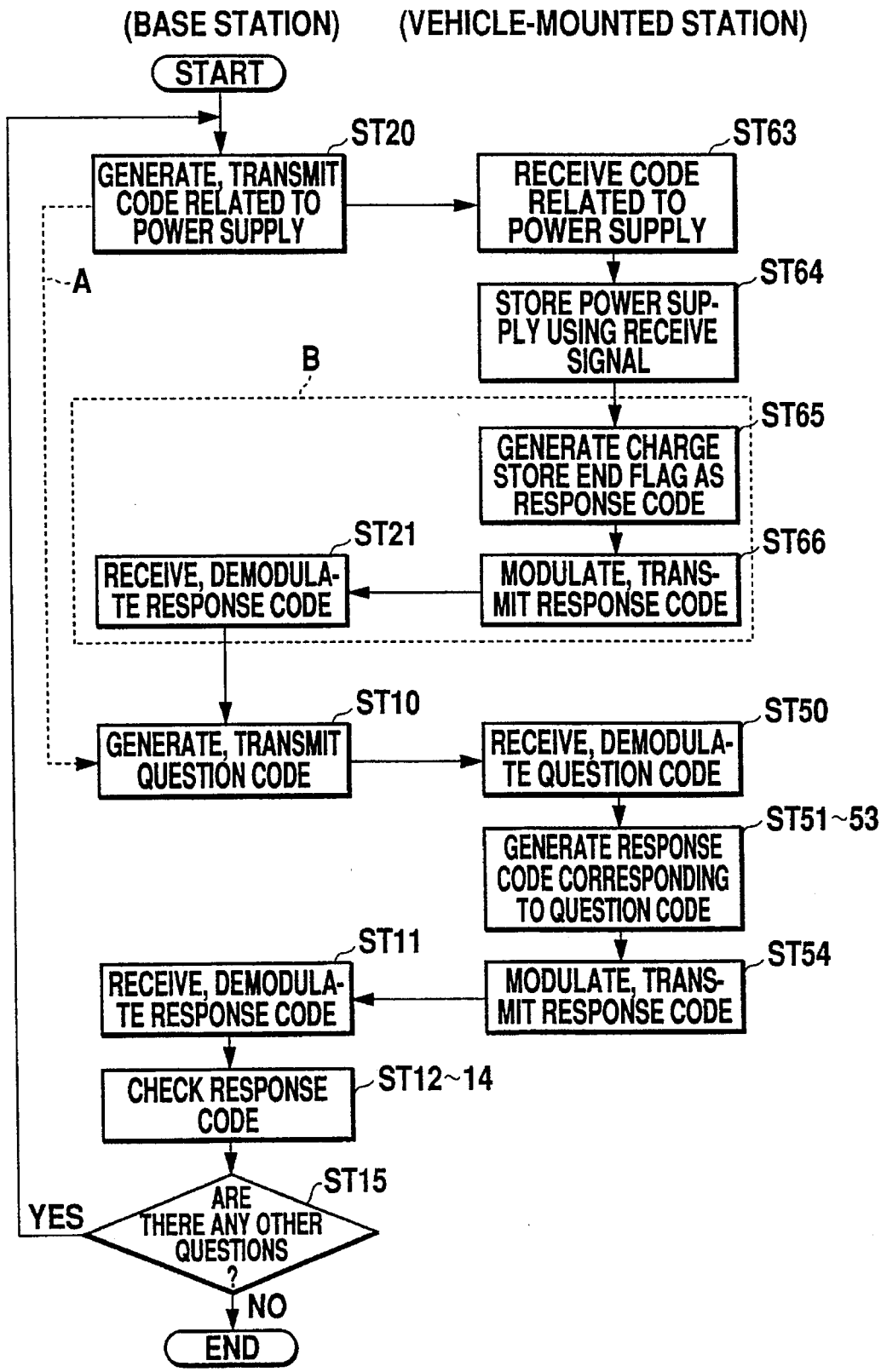
FIG. 16 is a flowchart showing the processing performed by a vehicle ID radar system according to the sixth embodiment of this invention.

FIG. 16 is a flowchart of the processing performed by the vehicle ID radar system according to the sixth embodiment.

Next, the operation will be described with reference to FIGS. 14–16.

The vehicle ID radar system operates only when the base station and vehicle-mounted radar unit are in close proximity. The vehicle ID radar system therefore need operate only for a very short time interval, and the power supply need have only a small capacity. For this reason, the power required by the vehicle-mounted radar unit can be supplied by the base station radar unit.

Figure 17:
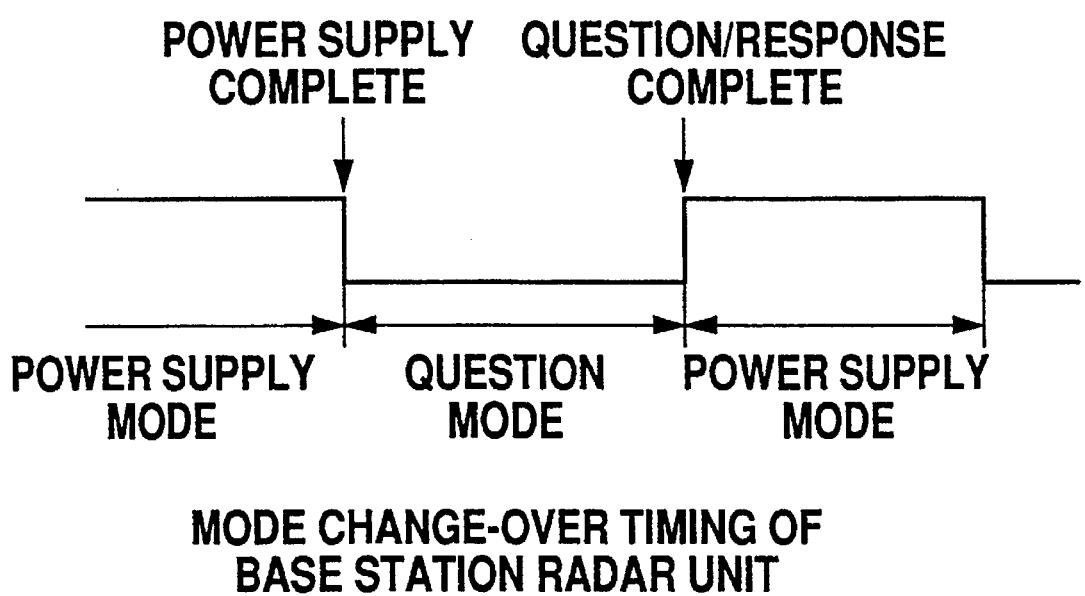
FIG. 17 is a drawing showing a change-over timing between a power supply mode and a question mode according to the sixth embodiment of this invention.

The vehicle ID system shown according to the sixth embodiment has two modes, i.e. a power supply mode wherein power is stored in the power supply, and a question mode for issuing questions. FIG. 17 shows the change-over timing of these two modes. When the vehicle is relatively far from the base station, the power supply mode is selected. When the vehicle is near, the question mode is selected.

In the power supply mode, the switch 29a of the base station radar unit 1 selects the power supply code generator 29b, and inputs the output to the modulator 12. The modulator 12 modulates the power supply code, and transmits the result to the vehicle-mounted radar unit 3 via the transmit/receive switch 15 and antenna 16 (ST20 in FIG. 16).

The power supply code received by the vehicle-mounted radar unit 3 is demodulated by the question code demodulator 38, and decoded by the question code decoder 39 (ST63 in FIG. 16).

When the question code decoder 39 determines that the received code is a power supply code, it changes over the power switch 45, and performs control so that the signal received by the antenna 36 is input to the rectifier 46. The rectifier 46 converts the received signal to a direct current, and supplies the current to the accumulator 47 (ST64 in FIG. 16). In this way, in the power supply mode, the accumulator 47 is charged by a signal transmitted by the base station radar unit 1.

When the vehicle approaches closer to the base station radar unit 1, the accumulator 47 is fully charged, so the vehicle ID radar system changes over to the question/response mode using secondary radar as shown in FIG. 17. FIG. 16 shows the detailed operation. When the vehicle-mounted radar unit 3 determines that the accumulator 47 has been sufficiently charged, a charge complete flag is generated as a response code (ST65 in FIG. 16). The vehicle-mounted radar unit 3 then modulates and transmits this response code (ST66 in FIG. 16).

When the base station radar unit 1 receives this response code, it changes over to the normal question mode (ST21 in FIG. 16).

The subsequent operations (ST10–15 and ST50–54 in FIG. 16) are the same as those in the preceding embodiments, so their description will be omitted here.

When it is desired to make the power supply completion time shown in FIG. 17 a fixed time, the steps S21, ST65 and ST66 shown in FIG. 16 are unnecessary.

According to the sixth embodiment, the vehicle-mounted radar unit is provided with an accumulator 47 that is charged by a signal transmitted by the base station radar unit 1, this accumulator 47 supplying the power required to operate the vehicle-mounted radar unit 3. There is therefore no need to supply power from a vehicle battery or the like, and the load due to batteries, etc. is reduced. Further, when a battery is provided, there is no risk that the vehicle-mounted radar unit 3 will cease to operate. Still further, there is no need for a connection between the vehicle-mounted radar unit 3 and the battery, so installation of the radar unit 3 is easy.

The transmitting power supplied by the base station radar unit 1 is extremely high, therefore if the signal received in the question mode can be used both for charging the accumulator 47 and for receive processing of the receiver 37, the power switch 45 may be replaced by a power distributor that supplies the received signal to both the receiver 37 and the rectifier 46 with a predetermined power ratio.

Embodiment 7

According to the aforesaid first to sixth embodiments, the beam patterns of the antennas were fixed, however the beam patterns may also be made variable if necessary.

Figure 18:
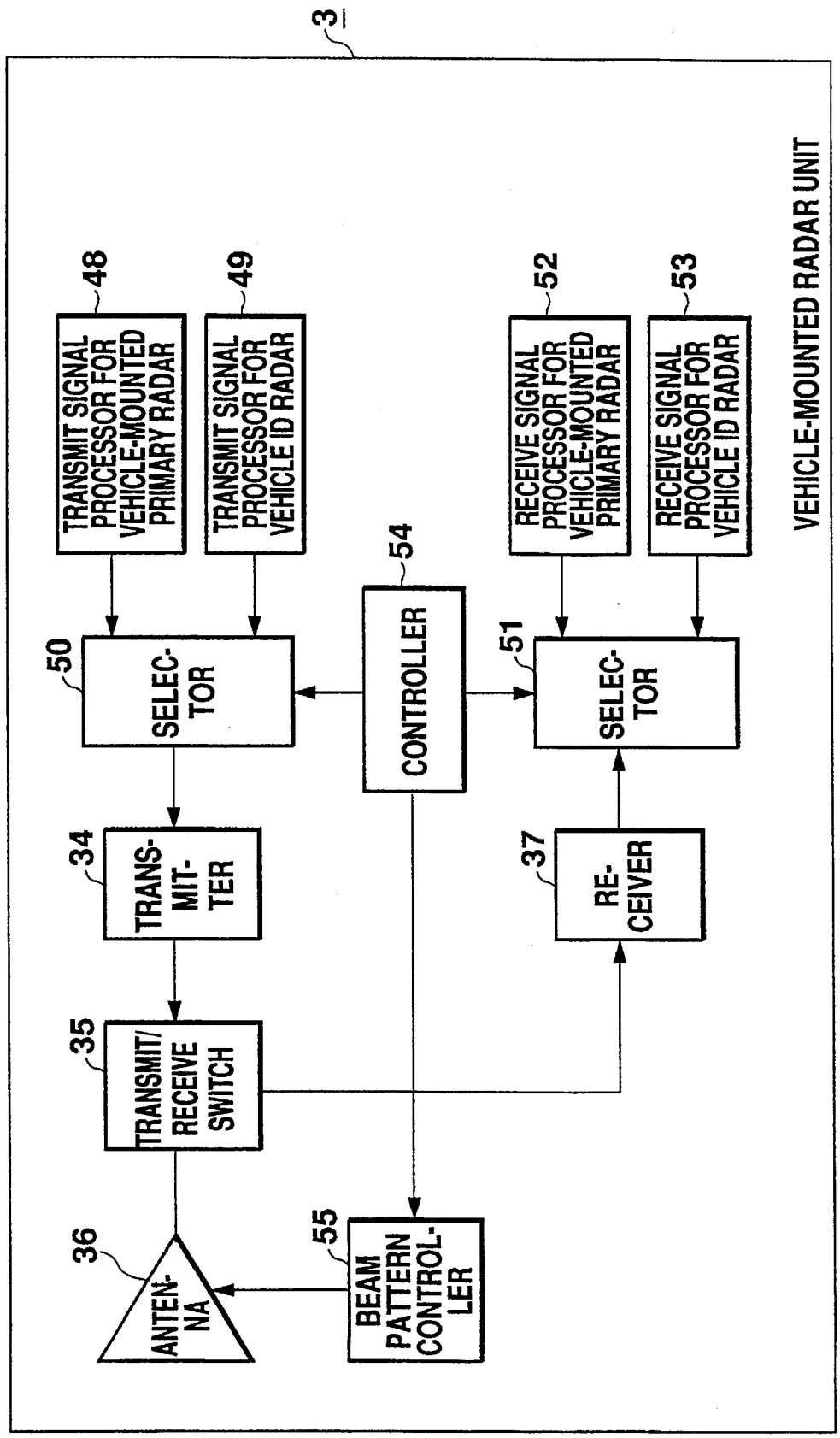
FIG. 18 is a schematic drawing of a vehicle-mounted radar unit according to a seventh embodiment of this invention.

FIG. 18 shows the construction of a vehicle-mounted radar unit 3 according to a seventh embodiment. In the figure, a vehicle-mounted primary radar transmit signal processor 48 emits a transmitted signal so that the radar unit 3 operates as primary radar. This processor 48 for example corresponds to the distance-measuring/speed-measuring pulse generator 23 of FIG. 8. Likewise, a vehicle-mounted primary radar receive signal processor 52 performs receive signal processing so that the radar unit 3 operates as primary radar. This processor 52 corresponds for example to the distance-measuring unit 26a, speed-measuring unit 26b and RCS computing unit 26c of FIG. 8. The vehicle-mounted primary radar may for example be anti-collision radar to prevent collision with the vehicle in front.

A vehicle ID radar transmit signal processor 49 generates a transmit signal so that the radar unit 3 operates as secondary radar. Likewise, a vehicle ID radar receive signal processor 53 generates a receive signal so that the radar unit 3 operates as secondary radar. These processors 49 and 53 correspond to the question code demodulator 38, question code decoder 39, question/response data bases 40a–40c and the response code generator 41 in FIG. 9.

A selector 50 selects either the output of the vehicle-mounted primary radar transmit signal processor 48 or the output of the vehicle ID transmit signal processor 49 according to the operating mode of the vehicle-mounted radar unit 3, and outputs the result to the transmitter 34. Likewise, a selector 51 outputs a received signal either to the vehicle-mounted primary radar receive signal processor 52 or the vehicle ID receive signal processor 53 according to the operating mode.

Figure 19:
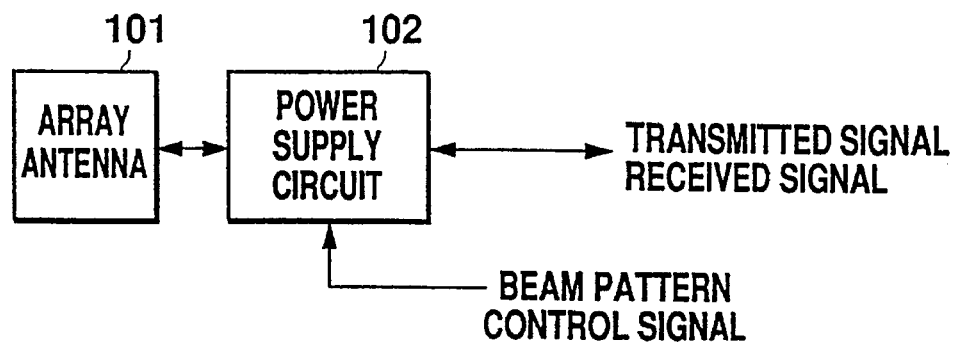
FIG. 19(a) is a drawing showing a typical example where a phased array system is used to control an antenna beam pattern according to the seventh embodiment of this invention.
FIG. 19(b) is a drawing showing a typical example where a DBF system is used to control an antenna beam pattern according to the seventh embodiment of this invention.
Figure 19:
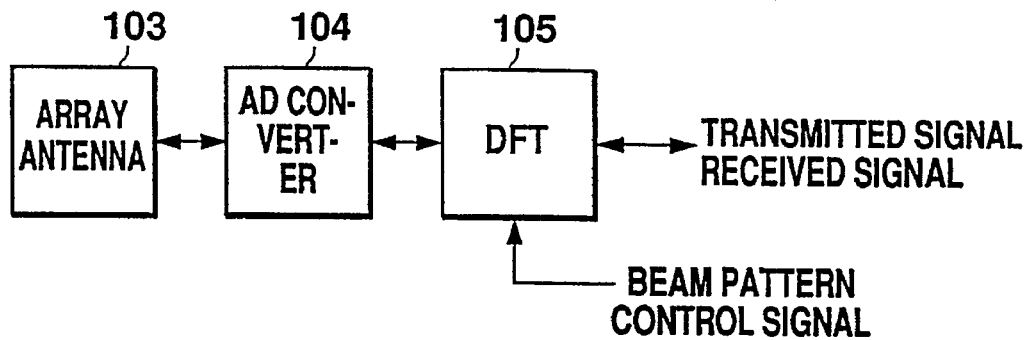
Figure 20:
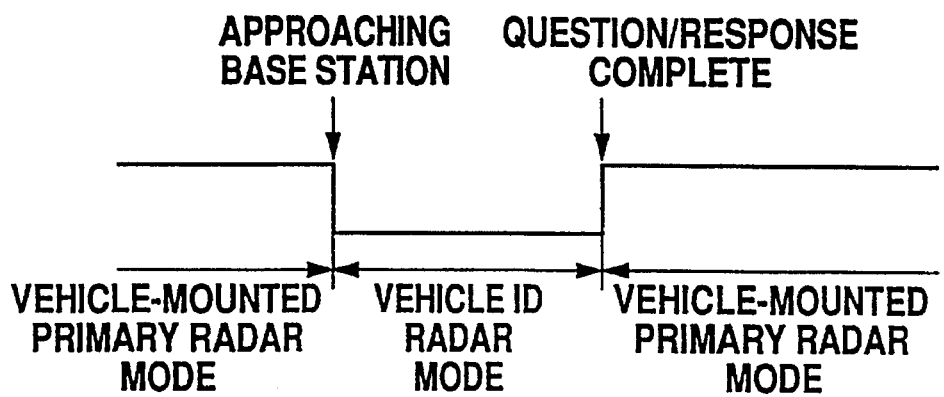
FIG. 20 is a drawing showing a change-over timing between a vehicle-mounted primary radar mode and a vehicle ID radar (secondary) mode according to the seventh embodiment of this invention.

A controller 54 controls the selectors 50, 51 by time division, and controls a beam pattern controller 55. FIG. 20 shows the control timing. The beam pattern controller 55 makes the beam pattern formed by the antenna 36 either a vehicle-mounted primary radar pattern or a vehicle ID radar beam pattern according to control by the controller 54. FIG. 19 shows specific examples of the antenna 36 and beam pattern controller 55.

Next, the operation of the vehicle-mounted radar unit 3 according to the seventh embodiment will be described. The characteristic feature of the operation of the seventh embodiment is that the beam pattern is controlled according to the operating mode. This point is described below.

In the seventh embodiment, as shown in FIG. 20, the system operates in a vehicle-mounted primary radar mode when the radar unit 3 is far removed from the base station. As it approaches the base station, the radar unit 3 changes to a vehicle ID radar mode, and the beam pattern of the antenna 36 is changed at that time. Before discussing how the beam pattern is changed, specific beam pattern change means shown in FIG. 19(a) and FIG. 19(b) will be described.

FIG. 19(a) shows a phased array system. A power supply circuit 102 adjusts the phase of a transmit signal supplied to an antenna array 101 or a signal received from the antenna array 101 based on a beam pattern control signal output by the beam pattern controller 55. The directionality and pattern of the antenna beam can thereby be adjusted. The antenna array 101 comprises a plurality of antenna devices.

FIG. 19(b) shows a DBF (Digital Beam Forming) system. Signals received from an antenna array 103 are first converted to digital signals by an AD converter 104. A DFT 105 performs a DFT (Discrete Fourier Transform) on these digital signals. By controlling the parameters in this conversion, the directionality and pattern of the antenna beam can be adjusted. The advantage of this DBF system is that a plurality of beams can be formed simultaneously.

FIG. 21(a) shows a typical beam pattern for a vehicle-mounted primary radar antenna used in a phased array system. A beam pattern 107 is relatively wide so that a vehicle 108 will not fail to be detected. The beam pattern 107 also scans to the left and right when searching for the vehicle as shown by the dotted lines in the figure. FIG. 21(b) shows a typical beam pattern for a vehicle-mounted primary radar antenna used in a DBF system. Apart from the fact that a multi-beam is used, the beam pattern in FIG. 21(b) is the same as in FIG. 21(a).

FIG. 22(a) shows a typical beam pattern of a vehicle-mounted primary radar antenna used in a phased array system, as in FIG. 21(a). FIG. 22(a) shows a beam pattern used for tracking the vehicle 108. This beam pattern narrows over a range covering the vehicle 108. FIG. 22(b) shows a typical beam pattern of a primary radar antenna used in a DBF system, as in FIG. 21(b). Apart from the fact that this beam is a multi-beam, the beam pattern in FIG. 22(b) is the same as that in FIG. 22(a).

FIG. 23(a) shows a typical beam pattern of a vehicle ID radar antenna using a phased array system. As one vehicle runs in one vehicle lane, this beam pattern 107 has a coverage of the same order as the width of the lane in which the vehicle is free to move. The width of this beam pattern 107 is such that it can be applied to all vehicle lanes. FIG. 23(b) shows a typical beam pattern of a vehicle ID radar antenna using a DBF system. Apart from the fact that this is a multi-beam, the beam pattern of FIG. 23(b) is the same as that of FIG. 23(a).

FIG. 24(a) shows a typical beam pattern of a vehicle ID radar antenna required when the vehicle is a large vehicle 108a, and FIG. 24(b) shows a typical beam pattern of a vehicle ID radar antenna required when the vehicle is a small vehicle 108b. When the vehicle is a large vehicle such as a bus or a truck, the beam width becomes larger as shown in FIG. 24(a), conversely, when the vehicle is a small vehicle such as a motorcycle or small car, the beam pattern becomes narrower as shown in FIG. 24(b). The beam pattern is therefore changed according to the size of the vehicle.

The controller 54 of FIG. 18 performs control so that the selectors 50, 51 select the vehicle-mounted primary radar processors 48, 52 when the primary radar mode is being used. At the same time, the controller 54 controls the beam pattern controller 55 so that the beam pattern of the antenna 36 is the pattern shown in FIG. 21 or FIG. 22.

On the other hand, when the vehicle ID radar mode is being used, the controller 54 performs control so that the selectors 50, 51 select the vehicle ID radar processors 49, 53. At the same time, the controller 54 controls the beam controller 55 so that the beam pattern of the antenna 36 is the pattern shown in FIG. 23. The controller 54 also determines a target size from a target RCS obtained when the vehicle-mounted primary radar mode is being used, and may select either the pattern in FIG. 24(a) or (b) accordingly.

According to this seventh embodiment, the base station radar unit may be fixed, or may itself be mounted on a vehicle.

According to the seventh embodiment, the antenna beam pattern of the vehicle-mounted radar unit 3 is varied appropriately according to the operating mode, so there is no risk that the vehicle-mounted radar unit will return a response to a different base station radar unit 1 by mistake. Further, the vehicle-mounted radar unit 3 is provided with primary radar that operates on a time division basis, so antennas, transmitters and receivers can be shared unlike the case where the primary radar is independent. This also reduces the cost of the radar equipment, and saves installation space.

Although the seventh embodiment has been described in the context of its application to the vehicle-mounted radar unit, the features of the seventh embodiment may also be applied to the base station radar unit 1.

Embodiment 8

The base station radar unit 1 may also be provided with a primary radar target tracking function.

Figure 25:
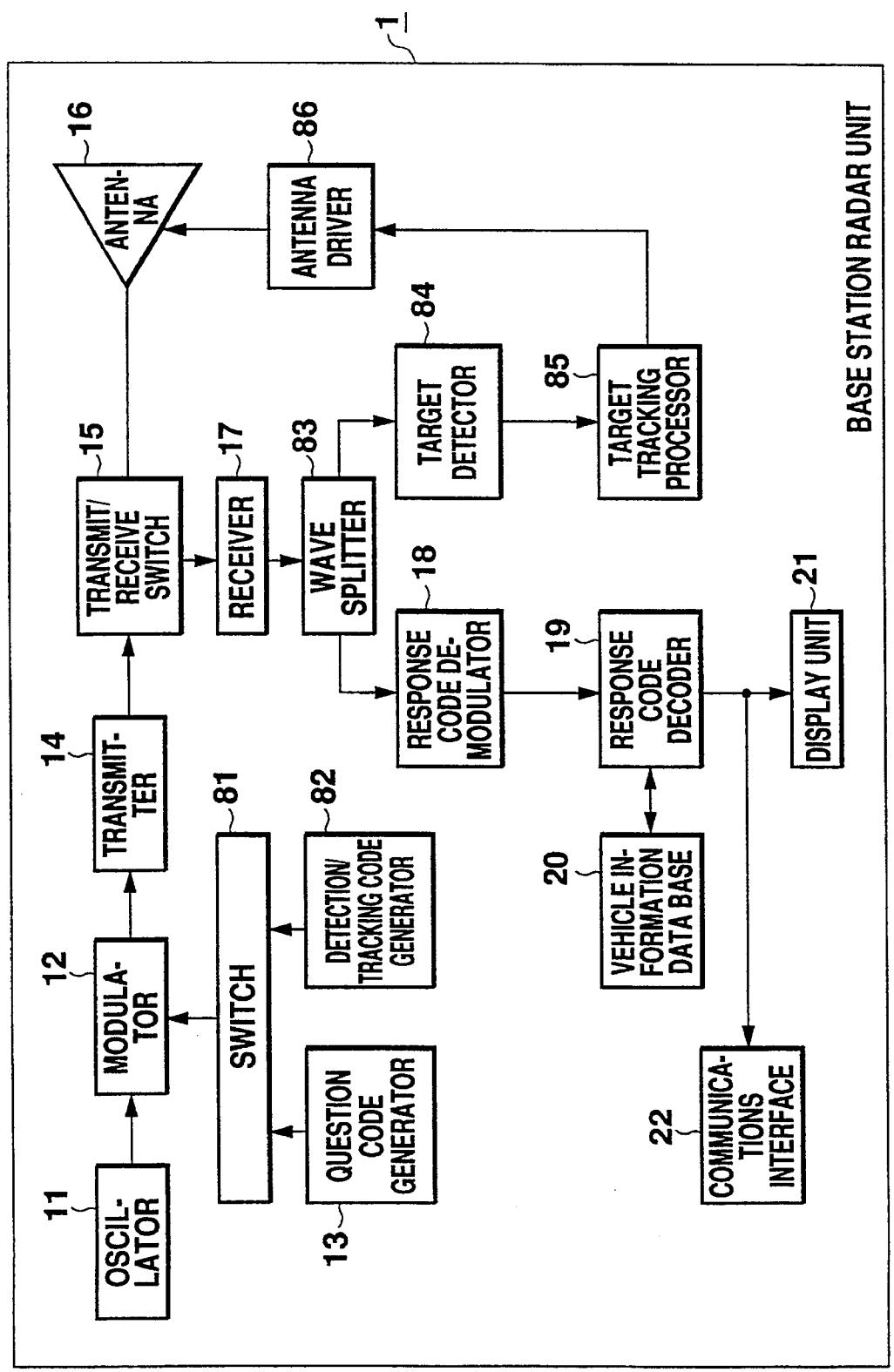
FIG. 25 is a schematic drawing of a base station radar unit according to an eighth embodiment of this invention.

FIG. 25 shows the construction of a base station radar unit according to an eighth embodiment. To the base station radar unit of FIG. 1, the following 6 elements have been added. These are a switch 81 that switches an input signal to the modulator 12 according to the radar operating mode, a detection/tracking code generator 82 that generates a modulating signal for primary radar operation, a wave splitter 83 that outputs a received signal to a target detector 84 during primary radar operation and outputs a received signal to the response code demodulator 18 during secondary radar operation, the target detector 84 that detects a target according to the received signal, a target tracking processor 85 that performs tracking processing based on the output of the target detector 84, and an antenna driver 86 that drives the antenna 16 based on the output of the target tracking processor 85.

Next, the operation of the base station radar unit 1 according to the eighth embodiment will be described. The description will focus mainly on the primary target tracking function.

In primary radar operation, the received signal is input to the target detector 84. When the target detector 84 detects a vehicle on the road, the target tracking processor 85 tracks this vehicle. The antenna driver 86 drives the antenna 16 in the direction of the specified vehicle based on tracking information obtained by the target tracking processor 85. In this tracking operation, the width of the antenna beam is narrow as shown in FIG. 22.

According to the eighth embodiment, the base station radar unit 1 is provided with a target tracking function, and the antenna beam moves as required by the motion of the vehicle. The base station therefore does not mistakenly process responses from other vehicles, and reliability of the system is increased. This advantage is further ensured by making the antenna beam narrow when tracking is performed. According to the eighth embodiment, therefore, the correct processing is performed even if response codes are simultaneously received from a plurality of vehicles.

Embodiment 9

The vehicle ID radar system according to the first embodiment may be further provided with a warning function that warns the driver when it is determined that a vehicle is being used illegally.

Figure 26:
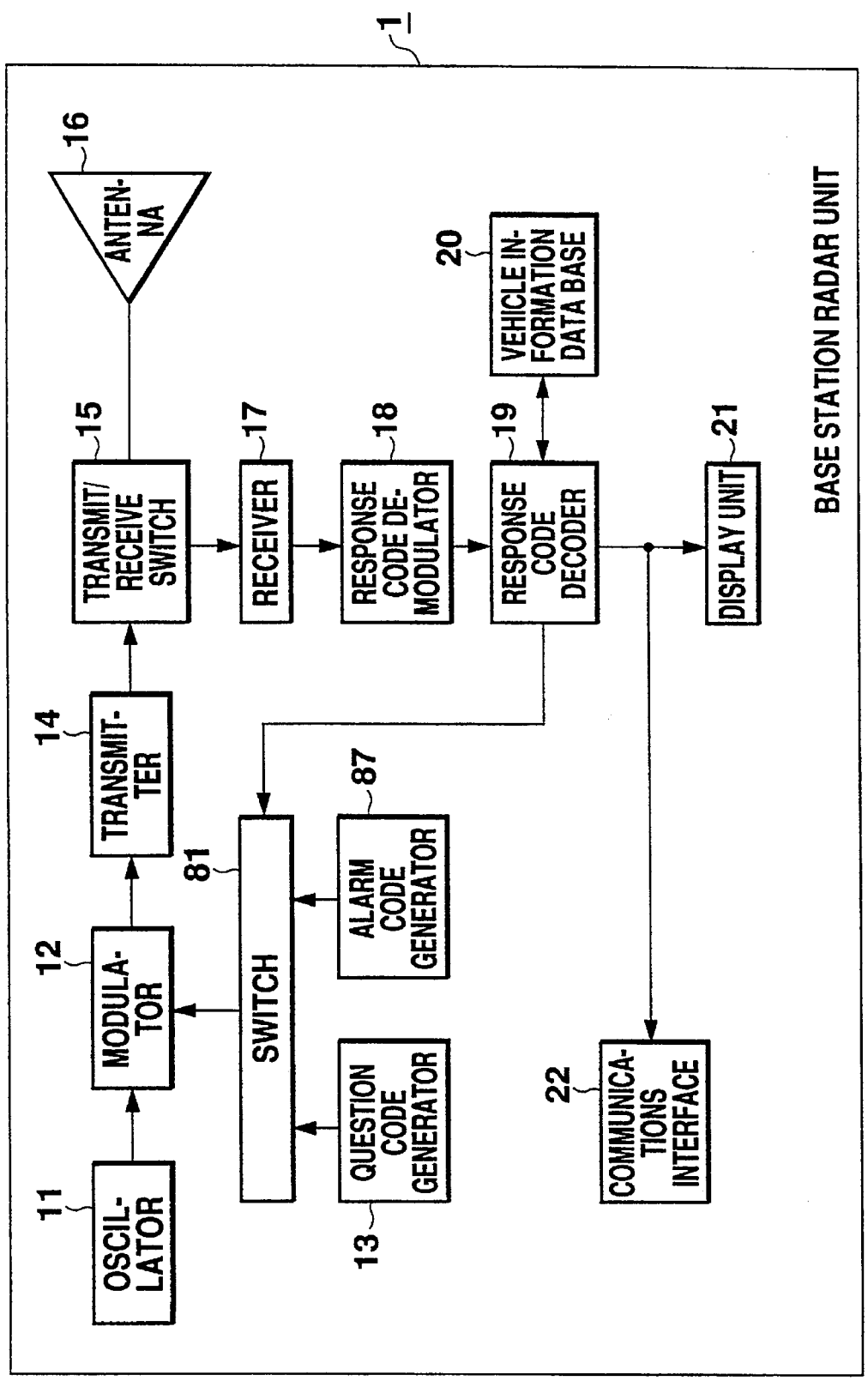
FIG. 26 is a schematic drawing of a base station radar unit according to a ninth embodiment of this invention.

FIG. 26 shows the construction of a base station radar unit 1 according to a ninth embodiment. In the base station radar unit 1 according to the ninth embodiment, the switch 81 and an alarm code generator 87 are added to the base station radar unit 1 of the first embodiment. The switch 81 selects either the output of the response code generator 13 or that of the alarm code generator 87 according to the decoding result of the response code decoder 19, and outputs the result to the modulator 12. This switching operation is performed on a time division basis. More specifically, the vehicle ID radar system according to the ninth embodiment first operates according to a question code, and then according to an alarm code. When the response decoder 19 determines that a vehicle is being used illegally, the alarm code generator 87 generates a predetermined alarm code. This alarm code is transmitted to the vehicle-mounted radar unit 3 via the antenna 16.

Figure 27:
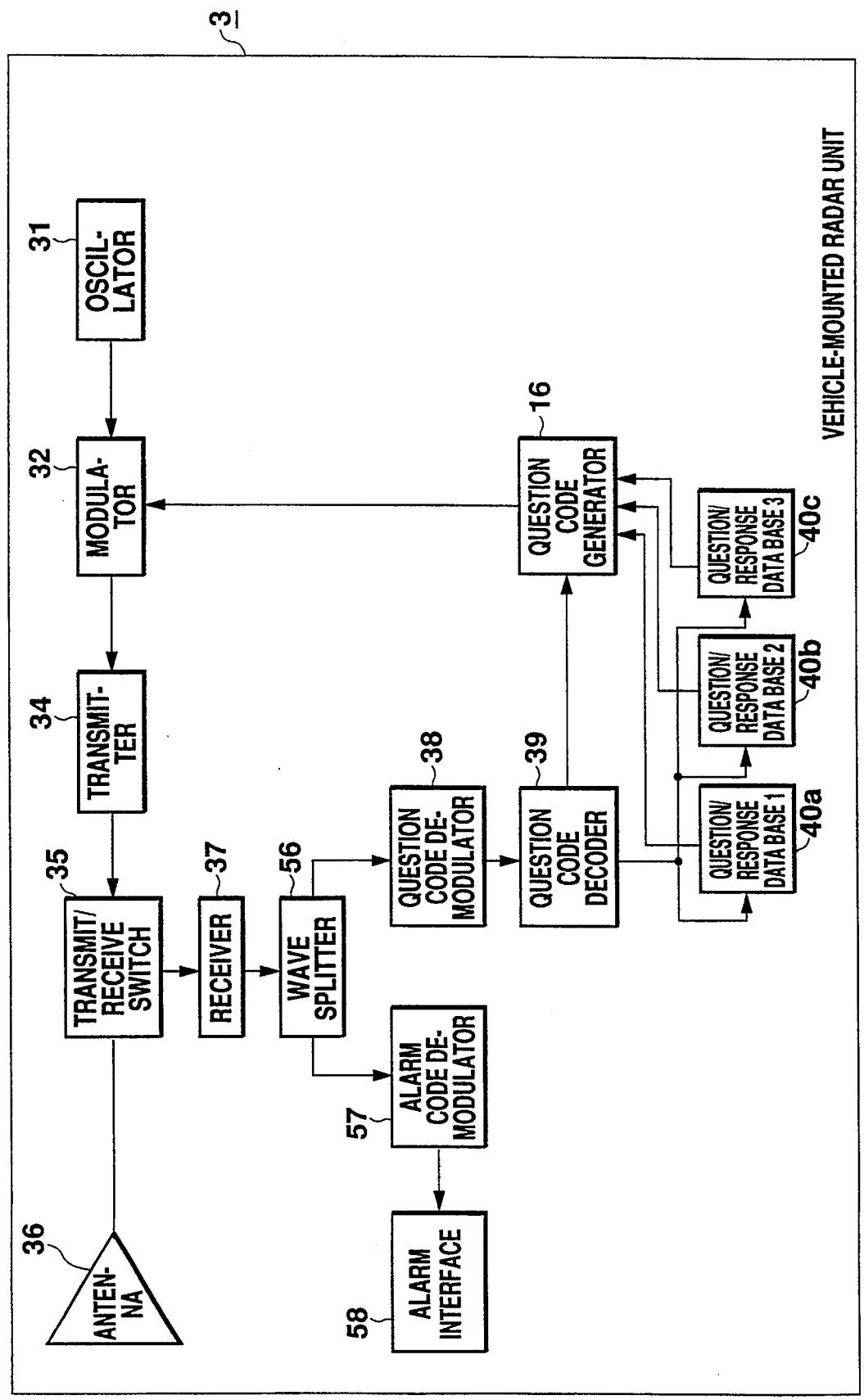
FIG. 27 is a schematic drawing of a vehicle-mounted radar unit according to the ninth embodiment of this invention.

FIG. 27 shows the construction of the vehicle-mounted radar unit 3 according to the ninth embodiment. In the vehicle-mounted radar unit 3 according to the ninth embodiment, a wave splitter 56, an alarm code demodulator 57 and an alarm interface 58 are added to the vehicle-mounted radar unit 3 of the first embodiment. The wave splitter 56 outputs a received signal output by the receiver 37, to the alarm code demodulator 57 in the alarm mode. The alarm code demodulator 57 demodulates a predetermined alarm code from the received signal. The alarm interface 58 displays the alarm code output by the alarm code demodulator 57 on a vehicle-mounted alarm display unit, not shown (or emits a tone).

The vehicle ID radar system according to the ninth embodiment normally operates in the question mode described in the first embodiment. However, when it is determined that the system is being used illegally based on the response contents, this vehicle ID radar system shifts to an alarm mode. The base station radar unit 1 transmits a predetermined alarm code, then the vehicle-mounted radar unit 3 demodulates this alarm code and issues a warning. The driver of the vehicle (or a third party) is thus alerted to the fact that his vehicle is illegal, and appropriate action can then be taken.

Embodiment 10

If the vehicle ID radar system of the first embodiment is installed at a gasoline stand or a paying parking lot, it may further comprise a tariffing function based on the amount of gasoline supplied or parking time period.

Figure 28:
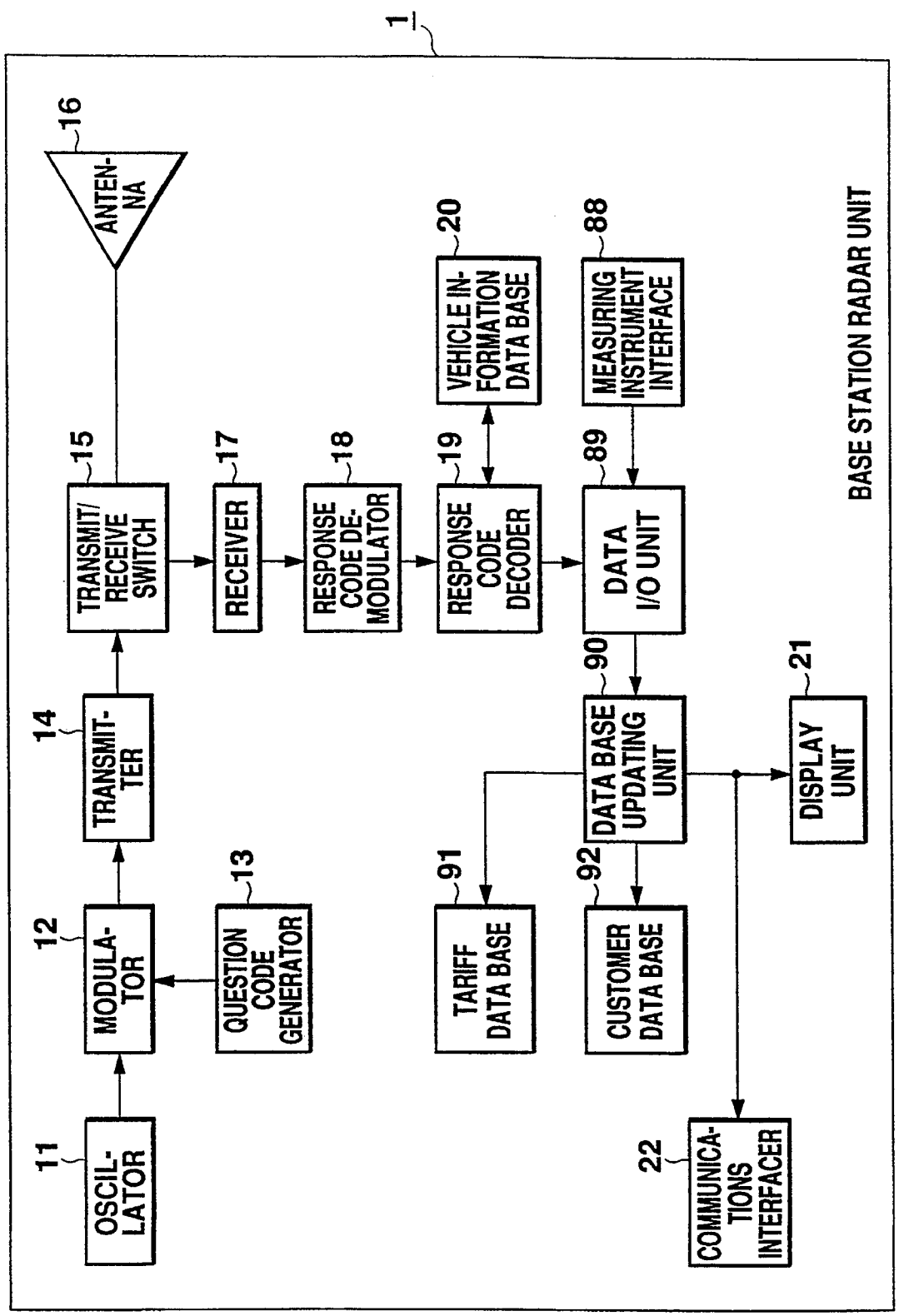
FIG. 28 is a schematic drawing of a base station radar unit according to a tenth embodiment of this invention.

FIG. 28 shows the construction of the base station radar unit 1 according to a tenth embodiment. In the base station radar unit 1 according to the tenth embodiment, an instrument interface 88, data input device 89, data base updating unit 90, tariffing data base 91 and customer data base 92 are added to the base station radar unit 1 of the first embodiment.

The instrument interface 88 receives instrument data such as amount of gasoline or length of parking time, this data being provided by external instruments, not shown, that measure gasoline amount supplied at a gasoline stand or time spent in a parking lot. The data input device 89 calculates the price of gasoline supplied or parking lot usage charge based on instrument data input from the instrument interface 88. The data input device 89, based on vehicle data input by the response code decoder 19, then establishes a correspondence between these usage charges and identifying information such as the user's vehicle number and type. Based on the correspondence between the usage charge and the user determined by the data input unit 89, the data base updating unit 90 updates a tariffing data base 91 wherein user tariffing information is stored, and a customer data base 92 wherein customer information is stored. User charges and other information are then displayed on the display unit 21, and are output to the communications interface 22 that handles communication with other instruments.

In the vehicle ID radar unit according to the tenth embodiment, if the base station radar unit 1 is installed at a gasoline stand or a paying parking lot, tariffing is performed according to tariff information (e.g. amount of gasoline supplied or length of parking time) input from outside, so gasoline and parking charges can be automatically processed in addition to toll charges. This permits more power saving and streamlining.

Further, as this vehicle ID radar unit generates and updates a tariffing data base and customer data base, a manager can easily manage the system and handle customers based on these data bases.

What is claimed:
1. A moving target identifying system comprising
a base station radar unit comprising:
a question generator which generates a plurality of predetermined questions,
a base station transmitter which modulates and outputs said plurality of question signals output by said question generator,
a base station antenna which radiates the output of said base station transmitter outside said base station, and receives signals from outside said base station,
a base station receiver which processes signals received by said base station antenna,
a moving target information data base wherein anticipated responses to said plurality of questions are stored,
a response demodulator which demodulates a plurality of response signals contained in the output of said base station receiver so as to obtain a plurality of responses, and reads a corresponding plurality of anticipated responses from said moving target information data base based on these demodulated results, and
identifying means which identifies moving targets by comparing said plurality of responses with said plurality of anticipated responses, and further comprises:
a mobile station radar unit comprising:
a mobile station antenna which receives transmitted signals from said base station radar unit, and radiates transmitted signals outside said mobile station,
a mobile station receiver which processes signals received by said mobile station antenna,
a response data base containing pre-stored response data corresponding to said plurality of questions from said base station radar unit,
a question demodulator which demodulates said plurality of question signals contained in the output of said mobile station receiver, and reads a corresponding plurality of responses from said response data base based on these demodulated results, a response generator which generates a plurality of response signals based on the output of said question demodulator, and a mobile station transmitter which modulates said plurality of response signals output by said response generator, and outputs the results to said mobile station antenna.

2. A base station radar unit comprising:

a question generator which generates a plurality of predetermined questions, a base station transmitter which modulates and outputs said plurality of question signals output by said question generator, a base station antenna which radiates the output of said base station transmitter outside said base station, and receives signals from outside said base station, a base station receiver which processes signals received by said base station antenna, a moving target information data base wherein anticipated responses to said plurality of questions are stored, a response demodulator which demodulates a plurality of response signals contained in the output of said base station receiver so as to obtain a plurality of responses, and reads a corresponding plurality of anticipated responses from said moving target information data base based on these demodulated results, and identifying means which identifies moving targets by comparing said plurality of responses with said plurality of anticipated responses.

3. A mobile station radar unit comprising:

a mobile station antenna which receives transmitted signals from outside said mobile station, and radiates transmitted signals outside said mobile station, a mobile station receiver which processes signals received by said mobile station antenna, a response data base containing pre-stored response data corresponding to a plurality of questions from outside said mobile station, a question demodulator which demodulates a plurality of question signals contained in the output of said mobile station receiver, and reads a corresponding plurality of responses from said response data base based on these demodulated results, a response generator which generates a plurality of response signals based on the output of said question demodulator, and a mobile station transmitter which modulates said plurality of response signals output by said response generator, and outputs the results to said mobile station antenna.

4. A mobile station radar unit as defined in claim 3 provided with a data base updating unit which determines, based on the output of said question demodulator, whether or not a question is a predetermined data updating command, and updates said response data base when said question is a data updating command.

5. A base station radar unit as defined in claim 2 provided with an alarm generator which outputs an alarm signal to said base station transmitter when the identification result for a moving target obtained by said identifying means is different from a predetermined identification result.

6. A mobile station radar unit as defined in claim 3 provided with an alarm demodulator which determines whether or not a question contained in the output of said mobile station receiver is an alarm, and demodulates it when it is an alarm, and an alarm device which outputs an alarm based on the output of said alarm demodulator.

7. A base station radar unit as defined in claim 2 provided with a tariffing data base which stores data related to user tariffing, a measuring instrument interface which receives data from external measuring instruments, and tariff processing means which performs tariff processing based on measuring instrument data output by said measuring instrument interface, and updates corresponding user data in said tariffing data base based on this tariff processing result and the identification result of said identifying means.

8. A base station radar unit comprising:

a question generator which generates a predetermined question, a pulse generator which generates pulses at predetermined intervals, a switch which selects and outputs either the output of said question generator or the output of said pulse generator, a base station transmitter which modulates and outputs the signal output by said switch, a base station antenna which radiates the output of said base station transmitter outside said base station, and receives a signal from outside said base station, a base station receiver which processes a signal received by said base station antenna, a moving target information data base wherein an anticipated response to said questions are stored, a response demodulator which demodulates a response signal contained in the output of said base station receiver so as to obtain a response when the output of said question generator is selected, and reads an anticipated response from said moving target information data base based on this demodulated result, moving target measuring means which collects data about a moving target based on a reflected signal from said moving target output by said base station receiver when said pulse generator is selected, identifying means which identifies said moving target by comparing the response and anticipated response output by said response demodulator with information about said moving target output by said moving target measuring means.

9. A base station radar unit as defined in claim 8 provided with a moving target detector which detects the presence or absence of a moving target based on the output of said base station receiver when said pulse generator is selected, and wherein said moving target measuring means performs processing when said moving target is detected by said moving target detector.

10. A base station radar unit as defined in claim 8 provided with a beam pattern controller that controls the beam pattern of said base station antenna to a first beam pattern when said question generator is selected, and controls the beam pattern of said base station antenna to a second beam pattern when said pulse generator is selected.

11. A base station radar unit as defined in claim 10 wherein said beam pattern controller uses a phased array system.

12. A base station radar unit as defined in claim 10 wherein said beam pattern controller uses a DBF (Digital Beam Forming) system.

13. A base station radar unit as defined in claim 10 wherein said beam pattern controller varies the width of each of said beam patterns depending on the situation.

14. A base station radar unit as defined in claim 10 wherein said beam pattern controller controls the width of each of said beam patterns to be of the same order as the range of movement of said moving target.

15. A base station radar unit as defined in claim 10 wherein said beam pattern controller narrows the width of said beam pattern when a moving target is detected.

16. A base station radar unit comprising:

a question generator which generates a predetermined question, a pulse generator which generates pulses at predetermined intervals, a switch which selects and outputs either the output of said question generator or the output of said pulse generator, a base station transmitter which modulates and outputs the signal output by said switch, a base station antenna which radiates the output of said base station transmitter to outside said base station, and receives a signal from outside said base station, a base station receiver which processes said signal received by said base station antenna, a moving target information data base wherein an anticipated response to said question is stored, a response demodulator which demodulates a response signal contained in the signal received from a moving target output by said base station receiver when the output of said question generator is selected, and reads an anticipated response from said moving target information data base based on this demodulated result, a moving target detector which detects said moving target based on a reflected signal from said moving target output by said base station receiver when said pulse generator is selected, a moving target tracking device which tracks said moving target when said moving target is detected by said moving target detector, and an antenna driver for orienting said base station antenna toward said moving target based on the output of said moving target tracking device.

17. A base station radar unit comprising:

a question generator which generates a predetermined question, a base station transmitter which modulates and outputs question signals output by said question generator, a base station antenna which radiates the output of said base station transmitter outside said base station, and receives signals from outside said base station, a base station receiver which processes a signal received from a moving target by said base station antenna, a moving target information data base wherein anticipated responses to said questions are stored, a response demodulator which demodulates a response signal contained in the output of said base station receiver so as to obtain a response, and reads a corresponding anticipated response from said moving target information data base based on this demodulated result, imaging means that obtains an image of a moving target, moving target recognizing means which obtains information about said moving target based on the output of said imaging means, and identifying means which identifies said moving target by comparing the response and anticipated response output by said response demodulator with information about said moving target output by said recognizing means.

18. A mobile station radar unit comprising:

a mobile station antenna which receives a transmitted signal from outside said mobile station, and radiates a transmitted signal outside said mobile station, a mobile station receiver which processes said signal received by said mobile station antenna, a response data base containing pre-stored response data corresponding to a question from outside said mobile station, a question demodulator which demodulates a question signal contained in the output of said mobile station receiver, and reads a corresponding response from said response data base based on this demodulated result, a response generator which generates a response signal based on the output of said question demodulator, a pulse generator which generates pulses at predetermined intervals, a switch which selects and outputs either the output of said question generator or the output of said pulse generator, a mobile station transmitter which modulates the signal output by said switch, and outputs the result to said mobile station antenna, and target measuring means which obtains information about an external target output by said mobile station receiver based on a reflected signal from said target when the output of said pulse generator is selected.

19. A base station radar unit as defined in claim 18 wherein the beam pattern of said base station antenna is controlled to a first beam pattern when the output of said response generator is selected, and is controlled to a second beam pattern when the output of said pulse generator is selected.

20. A base station radar unit as defined in claim 19 wherein the width of each of said beam patterns is varied according to the size of said moving target.

21. A moving target identifying system comprising a base station radar unit comprising:

a question generator which generates a predetermined question, a charge storing command generator which generates a predetermined charge storing command, a switch which selects either the output of said question generator or the output of said charge storing command generator, a base station transmitter which modulates and outputs the output of said switch, a base station antenna which radiates the output of said base station transmitter outside said base station, and receives a signal from outside said base station, a base station receiver which processes a signal received by said base station antenna, a moving target information data base wherein an anticipated response to said question is pre-stored, a response demodulator which demodulates a response signal contained in the output of said base station receiver so as to obtain a response, and reads a corresponding anticipated response from said moving target information data base based on this demodulated result, and identifying means which identifies a moving target by comparing said response with said anticipated response, and further comprises:

a mobile station radar unit comprising:

a mobile station antenna which receives a transmitted signal from said base station radar unit, and radiates a transmitted signal outside said mobile station, a mobile station receiver which processes said signal received by said mobile station antenna, a response data base containing pre-stored response data corresponding to questions from said base station radar unit, a question demodulator which demodulates a question signal contained in the output of said mobile station receiver, and reads a corresponding response from said response data base based on this demodulated result, a response generator which generates a response signal based on the output of said question demodulator, and a mobile station transmitter which modulates said response signal output by said response generator and outputs the result to said mobile station antenna, a distributor which distributes the signals received by said mobile station antenna when a question demodulated by said question demodulator is a charge storing command, a rectifier which rectifies the output signal from said distributor, and an accumulator which functions as a power supply charged by the output of said rectifier.

22. A base station radar unit comprising:

a question generator which generates a predetermined question, a charge storing command generator which generates a predetermined charge storing command, a switch which selects either the output of said question generator or the output of said charge storing command generator, a base station transmitter which modulates and outputs the output of said switch, a base station antenna which radiates the output of said base station transmitter outside said base station, and receives a signal from outside said base station, a base station receiver which processes said signal received by said base station antenna, a moving target information data base wherein an anticipated response to said questions is pre-stored, a response demodulator which demodulates a response signal contained in the output of said base station receiver so as to obtain a response, and reads a corresponding anticipated response from said moving target information data base based on this demodulated result, and identifying means which identifies a moving target by comparing said response with said anticipated response.

23. A mobile station radar equipment comprising:

a mobile station antenna which receives a transmitted signal from said base station radar unit, and radiates a transmitted signal outside said mobile station, a mobile station receiver which processes said signal received by said mobile station antenna, a response data base containing pre-stored response data corresponding to a question from said base station radar unit, a question demodulator which demodulates a question signal contained in the output of said mobile station receiver, and reads a corresponding response from said response data base based on this demodulated result, a response generator which generates a response signal based on the output of said question demodulator, a mobile station transmitter which modulates said response signal output by said response generator and outputs the result to said mobile station antenna, a distributor which distributes the signals received by said mobile station antenna when a question demodulated by said question demodulator is a charge storing command, a rectifier which rectifies the output signal from said distributor, and an accumulator which functions as a power supply charged by the output of said rectifier.

* * * * *